(12) United States Patent
Shorty

(10) Patent No.: US 6,879,806 B2
(45) Date of Patent: Apr. 12, 2005

(54) SYSTEM AND A METHOD FOR BUILDING ROUTING TABLES AND FOR ROUTING SIGNALS IN AN AUTOMATION SYSTEM

(75) Inventor: Peter Shorty, Copenhagen (DK)

(73) Assignee: Zensys A/S, Copenhagen (DK)

( * ) Notice: Subject to any disclaimer, the term of this patent is extended or adjusted under 35 U.S.C. 154(b) by 644 days.

(21) Appl. No.: 09/870,497

(22) Filed: Jun. 1, 2001

(65) Prior Publication Data

US 2003/0109270 A1 Jun. 12, 2003

(51) Int. Cl.[7] ................................................ H04B 7/15
(52) U.S. Cl. .................... 455/11.1; 455/41.1; 455/41.3; 455/9; 340/825.22; 340/825.72; 340/825.19
(58) Field of Search ........................... 455/11.1, 9, 41.1, 455/41.3, 450, 517, 445; 340/825.19, 825.22, 825.72

(56) References Cited

U.S. PATENT DOCUMENTS

| 4,250,489 A | 2/1981 | Dudash et al. |
| 4,427,968 A | 1/1984 | York |
| 4,626,848 A | 12/1986 | Ehlers |

(Continued)

FOREIGN PATENT DOCUMENTS

| DE | 40 15 457 A1 | 11/1991 |
| EP | 0 395 495 A1 | 10/1990 |
| EP | 0782117 A1 * | 9/1996 |
| EP | 0 782 117 A1 | 7/1997 |
| EP | 0923060 A2 | 6/1999 |
| GB | 2344675 A | 6/2000 |
| JP | 08293886 A | 11/1996 |
| WO | WO 95/01030 | 1/1995 |
| WO | WO 97/24840 | 7/1997 |
| WO | 9724840 A1 * | 7/1997 |
| WO | WO 97/32419 | 9/1997 |
| WO | WO 00/50971 | 8/2000 |
| WO | WO 01/78278 A1 | 10/2001 |
| WO | WO 01/78307 A2 | 10/2001 |

OTHER PUBLICATIONS

Petronel Bigioi, et al. "Transparent, Dynamicaly Configurable RF Network Suitable for Home Automation Applications" IEEE .Transactions on Consumer Electronics, vol. 45, No. 3, pp. 474–480, Aug. 1999.

"Crestron Residential Products: Crestron SmarTouch™ STS Expansion Modules," http://www.crestron.com/products/residential/r_sts_modules.html, Aug. 3, 2001, pp 1–2.

(Continued)

Primary Examiner—Nay Maung
Assistant Examiner—Angelica M. Perez
(74) Attorney, Agent, or Firm—Birch, Stewart, Kolasch & Birch, LLP

(57) ABSTRACT

The present invention relates to a wireless home automation system having a controller for controlling a broad variety of functions via two ways communication with a plurality of devices. More specifically, the invention relates to an improved and flexible way of routing signals from a controller to a device which includes the building of various tables such as routing tables. The improved and flexible way of routing allows the user to reach any device within the network with a high reliability. According to the invention, a processing unit of a controller is adapted to instruct a first device to discover other devices within its range by transmitting a signal comprising a device table holding device identifiers of devices controlled by the controller. The devices in the system are adapted to, upon instruction, perform a discovery of other devices within its range by transmitting discovery signals addressed to each device in the device table received from the controller. The devices save the identifiers of the device which acknowledges the reception of the discovery signals in a list indicating which devices of the device table it can reach and which it can not reach. The controller can at any time collect the saved list from a device to build a routing table.

31 Claims, 9 Drawing Sheets

U.S. PATENT DOCUMENTS

| | | | |
|---|---|---|---|
| 4,855,713 A | | 8/1989 | Brunius |
| 4,912,461 A | | 3/1990 | Cenzano, Jr. et al. |
| 4,940,964 A | | 7/1990 | Dao |
| 5,029,334 A | | 7/1991 | Braun et al. |
| 5,054,569 A | | 10/1991 | Scott et al. |
| 5,124,991 A | | 6/1992 | Allen |
| 5,129,096 A | | 7/1992 | Burns |
| 5,247,293 A | | 9/1993 | Nakagawa |
| 5,247,380 A | * | 9/1993 | Lee et al. ............ 398/118 |
| 5,381,136 A | | 1/1995 | Powers et al. |
| 5,398,257 A | | 3/1995 | Groenteman |
| 5,452,291 A | | 9/1995 | Eisenhandler et al. |
| 5,479,400 A | | 12/1995 | Dilworth et al. |
| 5,815,086 A | * | 9/1998 | Ivie et al. .......... 340/825.52 |
| 5,875,179 A | | 2/1999 | Tikalsky |
| 5,905,442 A | | 5/1999 | Mosebrook et al. |
| 6,055,429 A | * | 4/2000 | Lynch ................. 455/445 |
| 6,108,614 A | | 8/2000 | Lincoln et al. |
| 6,175,860 B1 | | 1/2001 | Gaucher |
| 6,192,282 B1 | | 2/2001 | Smith et al. |
| 6,374,079 B1 | * | 4/2002 | Hsu ................... 455/11.1 |
| 6,687,487 B1 | * | 2/2004 | Mosebrook et al. ....... 455/11.1 |
| 2001/0011284 A1 | | 8/2001 | Humpleman et al. |
| 2001/0043145 A1 | * | 11/2001 | Jacobson ............ 340/825.72 |
| 2002/0097165 A1 | * | 7/2002 | Hulme ............... 340/825.72 |

OTHER PUBLICATIONS

"Crestron Residential Products: Crestron SmarTouch™ STS/STS–C Wireless RF Control System," http://www.crestron.com/products/residential/r_sts.html, Aug. 3, 2001, pp 1–2.

"Crestron Residential Products: Crestron STX–1550C 2–Way Wireless RF Color Touchpanel," http://www.crestron.com/products/residential/r_stx–1550c.html, Aug. 3, 2001, pp 1.

"Crestron ST–COM / STI–COM RS–232 / 422 COM Module: Operations Guide," Crestron Remote Control Systems, Operations Guide—DOC.5695, pp. 1–14.

Haarsten, "Bluetooth—The universal radio interface for ad hoc, wireless connectivity," Ericsson Review No. 3, 1993, pp. 110–117.

Morel et al., "Requirements for Wireless Extensions of a FIP Fieldbus," Emerging Technologies and Factory Automation EFTA '96, Proceedings, 1996 IEEE Conference, vol. 1, Nov. 18–21, 1996, pp. 116–122.

* cited by examiner

SYSTEM AND A METHOD FOR BUILDING ROUTING TABLES AND FOR ROUTING SIGNALS IN AN AUTOMATION SYSTEM

FIELD OF THE INVENTION

The present invention relates to a wireless automation system having a controller for controlling a broad variety of functions via two ways communication with a plurality of devices. More specifically, the invention relates to an improved and flexible way of routing signals from a controller to a device, which includes the building of various tables such as routing tables. The improved and flexible way of routing allows the user to reach any device within the network with a high reliability.

BACKGROUND OF THE INVENTION

Home automation systems for controlling devices with various functions such as lighting and audio equipment within a building has evolved towards a "smart-home" concept, where different input/output (I/O) devices with a wide range of functions are remotely controlled by a central controller. Such systems are constructed as networks with a plurality of components such as controllers, I/O devices, dedicated signal repeaters or amplifiers.

The quality of such systems can typically be defined by a number of parameters:

Reliability. How often a signal is erroneous received by the intended receiver, or not received at all. The reliability can be quantified in a number of ways such as by MTBF or bit error rate, and a many types of errors can be detected and corrected automatically by the system. Reliability, as a quality parameter, is best described as whether the user regularly experiences that the system does not perform the desired task.

Range/coverage. How large a network can be supported by the system, and is there any required minimum density of signal repeaters or amplifiers. Also, can a device be connected to the network to send and receive signals anywhere within the range of the network, or are there any "dead spots".

Versatility. Which types of I/O devices and functions can be controlled by the system, and can the network support the required signals used for these applications. Can the network topology be expanded with new functionalities without undue burden and does the system/network support a large number of devices. These considerations are often related to a communication protocol of the system, and depend on whether the communication protocol is constructed with a specific application in mind or optimized to a specific type of I/O devices.

Flexibility. The system should be easy to install, set up, change, and use. Thus, the learning of new devices and configuring of routes for signal transmission should be automated to at least some degree. Also, the programming and use of functions, as well as expansion of the system, should be a simple and straightforward tasks for the user. This even more so in home automation systems for use in private homes.

Automation systems based on wired networks provide a high quality in the first three quality parameters but only rarely in the fourth parameter. Wired networks are often the primary choice in high capacity and high security systems where a high quality is required. However, wired networks have a number of obvious drawbacks:

Dependency of medium. The disconnection of an important wire section may freeze the entire network.

Low flexibility. Wired networks are very inflexible, if a device is desired at a position outside the existing network, or at a position within the network, which is not presently connected to the wired network, a new wire branch must be drawn and connected to the network.

Installation. The initial installation of the network, drawing and connecting wire, as well as extension of an existing network are laborious and often require assistance from professional personnel.

Price. The costs in connection with installation and extension of wired networks are extremely high. If a wired network for an automation system is to be installed in a family-size private home, the expenses for having the wires drawn and connected may add up to US Dollars 10,000 if installed during construction of the house, and to US Dollars 25,000 if to be installed in an existing house. On top of this comes the price for controllers, I/O devices, and signal repeaters or amplifiers.

Although wired networks generally provide a better quality, wireless networks have become more and more popular as a cheap and easy accessible network solutions. Wireless networks clearly overcome the above-mentioned drawbacks of wired networks. However, most existing low cost wireless automation systems have a low quality in the other mentioned parameters. Higher bandwidth wireless automation systems are typically very complex and require higher processing power whereby the price get close to the price for a wired network.

U.S. Pat. No. 5,905,442 discloses a wireless automation system with a centralized remote control which controls I/O devices for providing electrical power to appliances from power outlets of the power mains in building. The remote control and I/O devices comprise RF transceivers, and the system includes dedicated repeater units for repeating signals to I/O devices out of the range of the remote control.

U.S. Pat. No. 5,875,179 describes a method for synchronising communications over backbone architecture in a wireless network. The system invokes two controllers, one of which is a master and another which is an alternate master which will be activated only when the master is out of work. Dedicated repeaters and I/O devices in the system are commonly designated as devices, however, it is clear from the context that there is distinct functional difference between repeater devices and end (I/O) devices.

U.S. Pat. No. 4,427,968 discloses a wireless automation system with flexible message routing. A central station produces a signal for an I/O device, the signal contains a route code, an address code, an identifying code and a message code. Dedicated repeaters in the architecture receive the signals and follow a specified procedure for repeating signal. Repeaters may also be addressed as end devices, e.g. in order for the controller to download routing tables.

U.S. Pat. No. 4,250,489 describes a communication system having dedicated repeaters organised in a pyramidal configuration. The repeaters are bi-directionally addressable and may receive interrogation signals telling a repeater that it is the last repeater in the chain. The repeaters are not connected to appliances and do not perform any functions besides repeating and routing signals.

It is a disadvantage of wireless automation systems according to the prior art that they use broadcasting signals to determine the network topology of the system. Broadcasting signals are signals addressed to all devices receiving the signal and does not have a specific destination. In order for components in a wireless network to respond to a broadcasting signal, one of two procedures must be followed in order to avoid signal interference; (1) dedicated timeslots must be assigned to each component in the network which results in a slow processing in larger networks, or (2) dedicated transmission frequencies must be assigned to each component in the network which requires a large bandwidth. Typically, the network topology of the system is determined by scanning the whole network using broadcasting signals. Alternatively, the network may be divided into predetermined and fixed sub-networks which may be controlled individually.

SUMMARY OF THE INVENTION

The present invention provides a high quality, low cost wireless automation system using radio frequency (RF) signals. In order to reduce the price, the system according to the present invention preferably operates at bandwidth dedicated for control commands i.e. a bandwidth around 10 Kbps. Such a low bandwidth allows for chips that can be mass-produced at lower prices than chips for large bandwidth systems. Also, RF transmitters and receivers of the system preferably operate within a "public" frequency range wherein a license is not required, thereby further reducing cost.

However, choosing low bandwidth operation in a public frequency range introduces a number of problems which may reduce the quality of the system:

A low bandwidth gives a low capacity in the amount of data that can be comprised in signals.

A large number of apparatuses operate in public frequency ranges resulting in a large amount of radio frequency interference.

The allowed transmission power of RF transmitters is restricted which results in a limited signal range.

To overcome those problems, the system according to the present invention is optimized to ensure a high reliability, range/coverage, versatility, and flexibility.

In order to ensure a high reliability, range/coverage, versatility, and flexibility, the system according to the present invention provides a system having a new and inventive routing architecture for wireless networks which allows for much more complete and flexible routing schemes when compared to the systems of the prior art.

It is an object of the present invention to provide a wireless home automation system which greatly improves the quality of wireless networks in terms of reliability, range/coverage, versatility, and flexibility.

It is another object of the present invention to provide a wireless home automation system which provides a network of controllers and devices with an improved routing scheme which allows signals from a controller to reach any device in the network using the fastest and most reliable route, taking into account that the controller may change location.

It is still another object of the present invention to provide a wireless home automation system which provides a network of controllers and devices with an improved routing scheme which, in case of failure to reach a given device, provides a prioritized lists of alternative routes so as to reach the device using the fastest and most reliable alternative route.

It is a further object of the present invention to provide a wireless home automation system using radio frequency signals, thereby providing flexibility in terms of the physical placement of controllers and devices and yet providing fault tolerance or user feedback in case of malfunction.

It is a still further object of the of the present invention to provide a wireless home automation system that is flexible to a dynamically changing topology, in that the system in case of physical expansion or rearrangement of the network automatically updates its routing information without any direct user intervention.

In a first aspect, the invention provides an automation system for controlling and monitoring devices in a network of devices comprising:

a plurality of devices to be controlled, each device comprising:
   a radio frequency receiver for receiving signals,
   a radio frequency transmitter for transmitting signals,
   a memory for storing data representing a device identifier identifying the device and storing other data,
   a processing unit for administering the reception and transmission of signals and being adapted to read data from and store data in the memory, a controller comprising:
   a radio frequency transmitter for transmitting signals,
   a radio frequency receiver for receiving signals,
   a memory for storing data representing a controller identifier identifying the controller and storing data representing a device table holding device identifiers of devices controlled by the controller,
   a processing unit for administering the reception and transmission of signals and being adapted to read data from and store data in the memory, wherein the processing unit of the controller comprises means for generating a first signal for instructing a first device to discover other devices within its range, said first signal comprising the first device identifier as a destination identifier and at least some device identifiers from the device table, and wherein the processing unit of any first device of the plurality of devices comprises means for:
   upon receiving a first signal with its identifier as destination identifier, generating second signals for each device identifier in the first signal, each second signal comprising a device identifier from the first signal as destination identifier and the device identifier of the first device as source identifier,
   acknowledging the reception of a second signal by generating a third signal comprising the source identifier of the received second signal as destination identifier and the destination identifier of the received second signal as source identifier, and
   upon receiving a third signal with its identifier as destination identifier, storing data representing the source identifier of the third signal in its memory.

In a second aspect, the present invention provides a method for determining a network topology in an automation system network for controlling and monitoring devices comprising:

a plurality of devices to be controlled, each device comprising a memory for storing data representing a device identifier identifying the device and storing data representing a routing line indicating other devices which the device can successfully transmit signals to and receive signals from, and a processing unit for administering the reception and transmission of signals and being adapted to read data from and store data in the memory, a controller comprising a memory storing data representing a controller identifier identifying the controller and storing data representing a device table for holding device identifiers of devices controlled by the controller, and a processing unit for administering the reception and transmission of signals and being adapted to read data from and store data in the memory,
said method comprising the steps of:
transmitting a first signal from the controller for instructing a first device to discover other devices within its range, said signal comprising device identifiers from the device table,
receiving the first signal at the first device and transmitting second signals from the first device addressed to devices in the device table,
transmitting a third signal acknowledging the reception of the second signal from each device that received a second signal addressed to it, and
receiving any third signals at the first device and storing data representing the device identifiers of the devices which transmitted the received third signals in the routing line in the memory of the first device.

Preferably, the memory of the controller is further adapted to store data representing a routing table indicating for each of the plurality of devices, other devices which each device can successfully transmit signals to and receive signals from, in which case the method further comprises the steps of:
transmitting a fourth signal from the first device to the controller, the fourth signal holding the routing line, and
receiving the fourth signal at the controller and storing the routing line in the routing table of the memory of the controller.

In a third aspect, the invention provides a controller for controlling devices in an automation system, said controller comprising:
a radio frequency transmitter for transmitting signals,
a radio frequency receiver for receiving signals,
a memory for storing data representing a controller identifier identifying the controller and storing data representing a device table holding device identifiers of devices controlled by the controller,
a processing unit for administering the reception and transmission of signals and being adapted to read data from and store data in the memory,
wherein the processing unit of the controller comprises means for generating a first signal for instructing a first device to discover other devices within its range, said first signal comprising the device identifier of the first device as a destination identifier, a list of device identifiers from the device table, and instructions to the first device to generate and transmit signals to the devices from said list for determining which devices from said list can be reached from the first device.

In a fourth aspect, the invention provides a device to be controlled by a controller in an automation system comprising a plurality of devices, said device comprising:
a radio frequency receiver for receiving signals,
a radio frequency transmitter for transmitting signals,
a memory for storing data representing a device identifier identifying the device and storing other data,
a processing unit for administering the reception and transmission of signals and being adapted to read data from and store data in the memory,
wherein the processing unit of the device comprises means for:
upon receiving a first signal comprising its identifier as destination identifier, a list of device identifiers, and instructions to the device to generate and transmit signals to devices from said list for determining which devices from said list can be reached from the device, generating second signals for each device identifier in the list, each second signal comprising a device identifier from the list as destination identifier and the device identifier of the device as source identifier,
acknowledging the reception of a second signal by generating a third signal comprising the source identifier of the received second signal as destination identifier and the destination identifier of the received second signal as source identifier, and
upon receiving a third signal with its identifier as destination identifier, storing data representing the source identifier of the third signal in its memory.

In the present specification and claims, the term "processing unit" designates a unit comprising any processor or microprocessor such as a CPU or a software programmable microprocessor, as well as combinations thereof, capable of providing the required management of received and transmitted data, the processing unit further comprising memory such as Read Only Memory (ROM), Random Access Memory (RAM), Flash RAM, etc., for storing programs and routines to be executed by the processor. The unit preferably further comprises interface means for reading and storing data in a memory and interface means for generating signals and transmitting them to the transmitter for transmission and interface means for receiving signals from the receiver.

The term "memory" designates one or several memory areas adapted to store digital information. Preferably, it is possible to read, write and delete data in the memory. The memory might be allocated in a larger memory structure comprising several memories utilized by a processing unit for e.g. application program storage and/or data storage. Some parts of the memory may be non-volatile.

The term "signal" designates a conveyor of information, such as a series of pulses of electromagnetic (RF) radiation. Preferably, the signal is formed by a modulation of a carrier waveform and recovered during reception by demodulation. The modulations may be digital modulations so as to convey digital information. The information in a signal according to the present invention is preferably comprised in a digital communication frame, which comprises a number of bits identifying the frame and a number of bits conveying the transmitted information or data.

An identifier is a data string identifying a controller or a device or part of a device. Also, an identifier may identify a data structure such as a table or dedicated memory area. An identifier may be a name, a code or a number.

Controller and device identifiers are data strings identifying the individual controller or device as single, specific controller or device within a network. Controller or device identifiers are preferably used to address the specific controller or device in communication within a network. Preferably, the controller or device identifiers are used to designate the specific controller or device within a communication protocol, which is an agreed set of operational procedures to enable data to be transferred between controllers and devices.

In the automation system according to the present invention, a network is preferably characterized by a unique system identifier, which is used in all communication within the system. A unique identifier is a data string which is not identical to any data string used to identify any other system, controller, or device. A unique identifier is preferably set during fabrication and stored in non-volatile memory. Hence, identifiers for controllers and devices may comprise a first and a second part, wherein the first part is the unique system identifier and the second part is the identifier for each specific controller or device within the system. In this case, the two-part identifier identifying a controller or device is unique if the system identifier is unique. Preferably, the controllers does have unique identifiers set during fabrication, and the processing unit of the controller implemented in the system is adapted to make its unique identifier the unique system identifier.

Any signal within the system preferably comprises:
one or more destination identifiers which are the identifiers of controllers or devices to which the signal is addressed, these controllers or devices are named destination controllers/devices, and
a source identifier being the identifier of the controller or the device which transmits the signal, this controllers or devices is named the source controller/device.

Optionally, a signal may further comprise:
instructions related to the operation of the destination device or information related to the operation of an appliance connected to the destination device,
one or more repeater identifiers which are identifiers of devices which should repeat the signal, these devices are named signal-repeating devices, repeating devices or simply repeaters.

The first and second type signal according to the first four aspects of the present invention are preferably signals as described in the above, where the first type signal preferably comprises instructions to the destination device whereas the second type signal preferably does not. Preferably, the first signal comprises all device identifiers from the device table, except the device identifier of the first device. Alternatively, the first signal comprises all device identifiers from the device table, but the first device is adapted to not send a second signal to itself.

The data representing the identifiers of devices which responded by a third signal enables the system to see which devices the first device can send signals to and receive signals from. This data thereby represents the topology of the part of the network within the range of the first device. The function performed by the system for discovering this topology will be referred to as "discovery". Since all of the plurality of devices comprises the means enabling them to perform a discovery, the topology of the whole network may be determined by letting the devices perform discoveries in turn.

It is an important feature of the present invention that the first device is instructed which other devices it should look for in the discovery. This allows the first device to successively address each device directly on a dedicated signal and not by using broadcasting signals. The disadvantages of time slots or frequency hopping is thereby avoided.

Preferably, the controller can use the discovery information gathered by the devices to learn the network topology of the system by building a routing table indicating for each of the plurality of devices, other devices which each device can successfully transmit signals to and receive signals from. Hence, the memory of the controller may further be adapted to store data representing a routing table, the processing unit of any first device of the plurality of devices may further comprise means for generating a fourth signal comprising the identifier of the controller as destination identifier, stored data representing the source identifiers of any received third signals, and the device identifier of the first device as a source identifier, and the processing unit of the controller may further comprise means for receiving fourth signals from the devices to be controlled and forming the routing table.

It is another important feature of the present invention that each device performs its discovery individually, only the topology of the relevant parts of the network, i.e. parts which has been extended or rearranged, is discovered, instead of scanning the whole network from scratch which may require a very large number of signals. This feature allows the system according to the present invention to update a single line in the routing table instead of updating the entire routing table.

The controller uses the routing table to determine a route for a signal to be transmitted to a destination device which is outside the range of its transmitter. Using the routing table, the controller can determine devices which can reach the destination device, and which device that can reach those devices etc. Thus, using the routing table, the controller may calculate backwards to find a device within its range through which the destination device can be reached, maybe by using one or more further repeating devices therein between. In the present specification, the term "route" designates a series of signal repeating devices for receiving a signal and transmitting it again, in order to reach a device or controller beyond the range of the transmitter which originally transmitted the signal. Also, a routed signal is a signal which is received and transmitted by signal repeating devices in a route, the routed signal may change as a result of being addressed to succeeding devices in the route and may therefore, depending on the context, be considered as a series of signals with similar contents.

However, there will typically be a number of different possible routes to a given destination device, the controller should therefore find out which devices within its range it may use as an entry point in the route. An entry point is the first device in a route. Thus, the controller should first find out which devices is within its range, and then use the routing table to determine a route to the destination device using a device within its range as an entry point. Since the controller is typically portable, it may change position in the network, which complicates the task of finding which devices is within its range.

One possible solution to this problem, which has been utilized in the prior art, is to have the controller transmitting a broadcasting signal with regular time intervals, prompting any signal repeaters within its range to identify itself to the controller so that the controller knows which signal repeater to use for routing a signal at any time. However, this will create a lot of signal noise and require a lot of power since the controller will be transmitting broadcasting signals all the time.

According to the first aspect of the present invention, the controller may make educated guesses when trying to find an entry point and a to the destination device. Thus, the memory of the controller may further be adapted to store data representing a most used entry point list and the processing unit of the controller may further comprise means for forming and storing a most used entry point list in the memory by registering the number of successfully and failed transmitted signals from the controller to each device in the network, said most used entry point list indicating the device identifiers of the devices with which the controller regularly communicates.

By determining the devices with which the controller regularly communicates, the controller can use those devices as en entry point in a route, and have a good probability that the entry point is within its range.

The most used entry point list preferably comprises device identifiers for one or more devices in the network and a counter related to each device identifier in the list, the counter giving an indication of the number of successful transmissions to the related device. In order to maintain the most used entry point list, the means for forming the most used entry point list is preferably adapted to, in case of a transmission to a device in the most used entry point list, increase the counter related to the device if the transmission is successful and to decrease the counter related to the device if the transmission fails. Preferably, the means for forming the most used entry point list is further adapted to, in case of a transmission to a device which is not in the most used entry point list, include the device in the most used entry point list if the transmission is successful.

Similarly, according to the second aspect of the present invention, the memory of the controller may further be adapted to store data representing a most used entry point list, and the method may further comprise the steps of registering the number of successfully and failed transmitted signals from the controller to each device in the network, and, after a transmission to a device in the most used entry point list, increasing the counter related to the device if the transmission is successful and decreasing the counter related to the device if the transmission fails. Also, the method according to the second aspect preferably further comprises the step of, in case of a transmission to a device which is not in the most used entry point list, include the device in the most used entry point list if the transmission is successful.

Some devices are positioned more central in the network than others, these centrally positioned devices are particularly suitable as signal repeating devices since they can typically reach many other devices. Since it will very often be a waste of time to try to route a signal through a device positioned at the network perimeter, the controller may be programmed to use a centrally positioned device when determining an efficient route to a given destination device.

Hence, according to the first aspect of the present invention, the controller may build a preferred repeater list indicating one or more devices which together can route a signal from any device in the routing table to any other device in the routing table. Therefore, the memory of the controller may further be adapted to store data representing a preferred repeater list and the processing unit of the controller may further comprise a routine for analyzing the routing table to form the preferred repeater list and store said preferred repeater list in the memory of the controller.

Similarly, according to the second aspect of the present invention, the memory of the controller may further be adapted to store data representing a preferred repeater list, in which case the method preferably further comprises the steps of analyzing the routing table to identify one or more devices which together can route a signal from any device in the routing table to any other device in the routing table, and storing data representing the device identifiers of these one or more devices in the preferred repeater list.

As mentioned previously, the topology of the whole network may be determined by letting the devices perform discoveries in turn. However, discoveries are preferably only performed when necessary in order to minimize the number of transmitted signals, typically when the network is extended or changed. Therefore, the means for generating the first signal is preferably adapted to generate the first signal to the first device in response to a predetermined action.

When a new device expands the system, the processing unit of the controller can add the device identifier of the new device to the device table. A new device should be added to the routing table in order to be included in the routing functionality. Hence, the addition of the first device to the device table is preferably a predetermined action triggering the generation of a first signal to the added device.

If the position of a device in the network is changed, the system should preferably perform a discovery for this device. According to an embodiment of the invention, each device controlled by the controller is comprised in one or more groups of devices to be collectively controlled, each group comprising at least one device. In this embodiment, the processing unit of the controller comprises means for adding devices to and removing devices from a group, which the user will typically do when moving a device from one position in the network to another. Therefore, the means for adding and removing devices to/from groups is preferably further adapted to virtually mark a device in the memory of the first processing unit when it is removed from a group. The device is thereby made "suspicious" and the device should be instructed to perform a discovery as soon as possible. Therefore, the addition of a virtually marked device to a group is a predetermined action triggering the generation of a first signal to the added device. If the device is not immediately added to a new group, it may be instructed to perform a discovery the next time the controller has direct contact with the virtually marked device.

Similarly, according to the second aspect of the present invention, a device is preferably virtually marked when it is removed from a group, and the addition of a device to a group is a predetermined action if the added device is virtually marked.

Preferably, all devices are adapted to, upon reception of a signal, transmit an acknowledgement signal wherein the destination identifier and source identifier is interchanged (of course, the reception of such acknowledgement signals should generally not be acknowledged by another acknowledgement signal). Such acknowledgement signal preferably consists of a signal identical to the received signal except for a predetermined setting indicating that the signal is an acknowledgement signal wherefore the destination identifier and source identifier should be read the other way around. Hence the third type signal according to the present invention may be such an acknowledgement signal.

The system according to the present invention preferably comprises a protocol. A protocol is any set of operational procedures, which enable the processing unit to perform the desired functions. Thus, the means for generating a first signal and various means comprised in these means, are typically programs or routines forming part of the protocol. Preferably, it is the protocol of the transmitting controller/device that generates frames to be transmitted in a signal. Such frame preferably designates the system, the source controller/device and the destination controller/device by their identifiers, and one or more signal repeating devices by their identifiers. Also, the protocol includes the commands, information or data transferred by the frame. Likewise, it is preferably the protocol in the receiving part, which reads the received frame and enables the receiving part to understand and respond to the signal.

In order to reduce the amount of data transferred in each frame, the system protocol preferably comprises operational procedures for masking the identifiers of devices addressed by a frame. The masking procedure is an operation that builds a register with each entry corresponding to a device, and where the value of each entry indicates whether the corresponding devices should respond to a command in the frame or not. Instead of including all the identifiers for the devices that should respond to a command in a frame one includes the masking register or the "bitmask", whereby a shorthand designation of devices is achieved. Thus, the system protocol preferably comprises a procedure for masking device identifiers in a table in order to generate a string of bits making up the bitmask so that each bit corresponds to a device identifier, the value of each bit determining whether the one or more commands applies to the corresponding device. Similarly, the system protocol preferably comprises operational procedures for applying a masking procedure to the commands or data in a frame.

Hence, when a signal is said to comprise identifiers of controllers or devices in the network, the signal may not comprise the full identifier, but may comprise only a string or a code indicating the identifier such as a bit corresponding to the identifier using a predetermined bitmask defined in the communication protocol of the system. Similarly, when an identifier is saved in a memory, the full identifier may not to be saved, the memory may hold only a string or a code indicating the identifier such as a bit corresponding to the identifier using the predetermined bitmask.

According to the first, second, and third aspects, the controllers of the system preferably comprise a display, means for displaying a plurality of menus having two or more entries on the display, two or more actuators for navigating in said menus and for selecting said entries, and routines or programs stored in the processing unit of the controller which can be activated by selecting appropriate entries in appropriate menus. Preferably said routines or programs is operationally connected to means for generating a signal addressed to one or more devices so that the user can control the system by selecting entries using the actuators.

The signal repeating devices used to route a signal may be dedicated repeaters performing only the function of repeating signals in the system. However, one or more devices according to the first and second aspects of the present invention may have a dual functionality in that they can act as I/O devices as well as repeaters. The signal range of a transmitter is the physical range within which a device/controller can receive and process a signal addressed for that device/controller. When a device receives a signal carrying information and designating the device's identifier as a repeater identifier, the device will repeat the signal, that is, transmit a signal carrying at least part of the information also carried by the received signal. Thereby devices or controllers within the signal range of the repeating device, but outside the signal range of the original transmitter, can receive the signal transmitted by the repeating device. Preferably all devices in a system can act as repeating devices. This functionality is the subject matter of the international patent application PCT/DK01/00253 (publication number not available at present) by the applicant.

According the present invention, each of the plurality of devices may be an I/O device in that it further comprise means for providing an output to, or receiving an input from, an appliance operationally connected to the device. Also, the processing unit of the controller may further comprise means for generating a fifth signal comprising at least one destination identifier corresponding to a device identifiers of a destination device, information related to the operation of the destination device or the appliance connected to the destination device, and repeater identifiers corresponding to one or more signal repeating devices. In this case, a device may have dual functionality in that it is further adapted to act as signal repeating devices in that its processing unit comprise means for, upon reception of a fifth signal, processing said information in its processing unit if the at least one destination identifier corresponds to the device identifier of the device, and means for, upon reception of a fifth signal, transmitting a sixth signal holding the at least one destination identifier and said information if one of the one or more repeater identifiers corresponds to the device identifier of the device.

Thus, a device may have a dual functionality in that they function as an input/output (I/O) device and as a signal-repeating device. Preferably, all are adapted to act as I/O devices and signal repeating devices.

This dual functionality of devices according to the present invention has a number of significant advantages:

There is no need for dedicated repeater stations which results in the following advantages: the system comprises fewer devices than systems according to the prior art, the system becomes cheaper, the system becomes easier to install since the user does not have to setup an even distribution of dedicated repeater stations.

The system has a network with as many potential repeaters as there are devices which results in the following advantages: The number of possible routes to any given device is immensely increased in relation to networks of the prior art. The number of possible routes to a device is an extremely important parameter in RF networks since a lot of environmental features may block signals coming from certain directions. One of the most encountered causes of signal transmission errors in RF systems are metal objects which either blocks the path to a device, or is positioned in the vicinity of the device reflecting the signal so that it interferes with the original non-reflected signal. Hence, when encountering a signal transmission error, the system according to the present invention may chose between a large number of alternative routes to the destination device, which routes have a high chance of success simply because they transmit from another direction/position. Thus, the dual functionality greatly improves the reliability, range and coverage of RF networks. Also, it greatly improves the versatility, expandability, and flexibility of the network since the network topology may be changed without undue burden.

Preferably, the devices establish a network which can reach all devices in the system. However, in cases where a device or a group of devices is located far away from the remaining part of the network, it may be necessary to include one or more devices between the remaining system and the remote device/group with the sole purpose of repeating signals to the remote device/group. The inserted devices may of course be connected to an appliance and function also as normal input/output devices later on. In order to establish a network with good coverage, it may be preferable to build a network with a substantially uniform distribution of devices and with a minimum density of devices. This will ensure that all devices can be reached. Such minimum density of devices should be adjusted to the average range of the transmitters, which, however, depends strongly upon the environment.

The input or output from a I/O device is a signal to an appliance operationally connected to the device, and comprises one or more instructions related to the operational state of the appliance. The appliance connected to an I/O device may be integrated with the device so that the appliance and the device form parts of the same unit. Thereby the user may control the operation of the appliance by controlling the first device. Hence the user may operate the appliance remotely.

According to the first four aspects of the present invention, the system may build various tables and lists holding information which can be used to optimize the determination of a route to a given destination device. In a fifth aspect, the present invention provides a method for using this information for routing signals in an automation system network.

Hence, the fifth aspect of the present invention provides a method for routing signals in an automation system network for controlling and monitoring devices comprising:

a plurality of devices to be controlled, each device comprising a memory storing data representing a device identifier identifying the device and a processing unit for administering the reception and transmission of signals, a controller comprising a memory storing data representing a controller identifier identifying the controller, storing data representing a routing table indicating for each of the plurality of devices, other devices which each device can successfully transmit signals to and receive signals from, and storing data representing a most used entry point list being an ordered list indicating the device identifiers of the number, N, of devices that have the highest transmission success counter corresponding to the number of successful transmission from the controller to a device minus the number of failed transmissions from the controller to the device, and a processing unit for administering the reception and transmission of signals and being adapted to read data from and store data in the memory, said method comprising the steps of:

A. transmitting a first signal from the controller to a specified device at least once, said signal comprising the identifier of the specified device as a destination identifier, B. if said first signal is received by the specified device, transmitting an acknowledgement signal from the specified device to the controller C. if no acknowledgement signal is received by the controller, then choosing the first device from the most used entry point list as a first repeating device D. determining a route to the specified device in the routing table, the route using one or more repeating devices, the first of which is the first repeating device, E. transmitting a second routed signal from the controller at least once, said signal comprising the identifier of the specified device as a destination identifier and the identifiers of the one or more repeating devices from the route determined in step D as repeater identifiers, F. transmitting a routed acknowledgement signal from the specified device to the controller upon reception of the routed second signal, and G. as long as no routed acknowledgement signal is received by the controller from the specified device, then repeating steps D, E, and F for N−1 times using the second, third, . . . Nth device from the most used entry point list as a first repeating device.

Steps A and B determines whether the destination device is within the transmission range of the controller, if not, the method provides steps C through G to use the most used entry point list to make educated guesses of which device to use as entry point in a route to the destination device.

Preferably, the memory of the controller further stores data representing a preferred repeater list indicating one or more devices which together can route a signal from any device in the routing table to any other device in the routing table. In this case, the method further comprises the steps of:

H. if no routed acknowledgement signal of the Nth second routed signal is received by the controller from the specified device, then choosing the first device from the preferred repeater list that is not in the most used entry point list as a first repeating device, I. determining a route to the specified device in the routing table, the route using one or more repeating devices, the first of which is the first repeating device, J. transmitting a second routed signal from the controller, said signal comprising the identifier of the specified device as a destination identifier and the identifiers of the one or more repeating devices from the route determined in step H as repeater identifiers, K. transmitting a routed acknowledgement signal from the specified device to the controller upon reception of the routed second signal, and L. as long as no routed acknowledgement signal is received by the controller from the specified device, then repeating steps H, I and J for each device in the preferred repeater list using the corresponding device from the preferred repeater list as a first repeating device.

Thus, if none of the devices in the most used entry point list is within the transmission range of the controller, the method provides steps H through K to use the preferred repeater list to make educated guesses of which device to use as entry point in a route to the destination device.

According to the fifth aspect, the devices in the system preferably have the dual functionality described in relation to the first aspect. Thus, the processing units of each of the plurality of devices are preferably further adapted to provide an output to, or receive an input from, an appliance operationally connected to the device, in which case the method preferably further comprises the steps of:

transmitting a third signal from the controller, the third signal comprising at least one destination identifier corresponding to the identifier of a destination device or destination controllers, information related to the operation of a device or an appliance connected to a device, and one or more repeater identifiers corresponding to device identifiers one or more signal repeating devices, receiving the third signal at one of said plurality of devices, if the at least one destination identifier corresponds to the device identifier of the receiving device, then processing said information in the processing unit of the device, and if one of the one or more repeater identifiers correspond to the device identifier of the receiving device, then transmitting a fourth signal holding said at least one destination identifier and said information.

If the third signal is transmitted by the controller, the at least one destination identifier comprised in the third signal is preferably a device identifier, and the information comprised in the third signal preferably comprises instructions to a processing unit of the destination device to provide an output to, or receive an input from, the appliance connected to the destination device.

Similarly, if the third signal is transmitted by a device, the at least one destination identifier comprised in the third signal is preferably a controller identifier, in which case the information held by the third signal is typically related to a state or a reading of the device transmitting the third signal.

Preferably, all devices in the system are adapted to respond to all received signals which were addressed to them with an acknowledgement signal. Hence, the method according to the fifth aspect of the present invention preferably further comprises the step of, upon receiving a third or fourth signal at a device, generate and transmit a first acknowledgement signal having the identifier of the device or controller transmitting the third or fourth signal as destination identifier.

If the device has received a second signal, i.e. a signal that has been repeated, it should preferably send an acknowledgement signal to both the controller transmitting the third signal and the repeater device(s) transmitting the fourth signal(s). The acknowledgement signal to the controller transmitting the third signal preferably comprises a destination identifier and one or more repeater identifiers, hence, the method preferably further comprises the steps of receiving said first acknowledgement signal at a device and if one of the one or more repeater identifiers correspond to the device identifier of this device, then transmitting a second acknowledgement signal holding said destination identifier.

DETAILED DESCRIPTION OF THE PREFERRED EMBODIMENTS

The present invention relates to an automation system having a controller for controlling a broad variety of functions via two ways communication with a plurality of devices. A controller thereby allows the user to control the devices and the functions performed by the devices.

Figure 1:
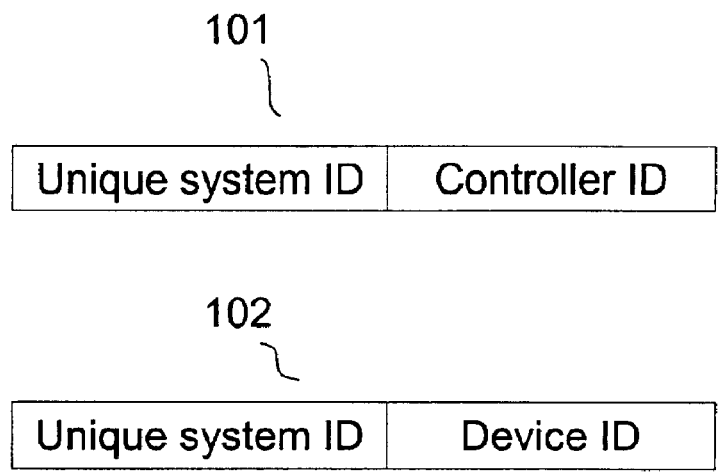
FIGS. 1 and 2 are diagrams illustrating the identifiers for controllers and devices used to address signals according to a first preferred embodiment of the present invention.

The present invention will be described in relation to a first preferred embodiment. According to the first preferred embodiment, the automation system comprises a communication protocol providing a simple addressing of devices and controllers. First, all controllers and devices are combined into a unique logical system characterized by a unique system identifier comprised in almost all communication signals within the system. The controllers and the devices in the system are individually characterized and addressed within the system. FIG. 1 shows examples of such two-part identifiers 101 and 102 for addressing a controller and a device in a signal respectively.

Thereby a system does not interfere with a neighboring system since controllers and devices in the respective systems respond only to signals comprising the unique system identifier of the respective systems. The system identifier will be called the Home ID in the following.

Each controller has a pre-set unique identifier which is written in a memory in the controllers from factory and which cannot be altered. This ensures the uniqueness of the controller identifiers. Upon setting up the system, the unique identifier of the first controller will be promoted as the Home ID. Since the controller identifier is unique, so is the assigned Home ID. It is an advantage that the system inherently has a unique Home ID, thereby the user does not have to specify a Home ID when setting up the system. This greatly simplifies the functionality of the system.

Figure 2:
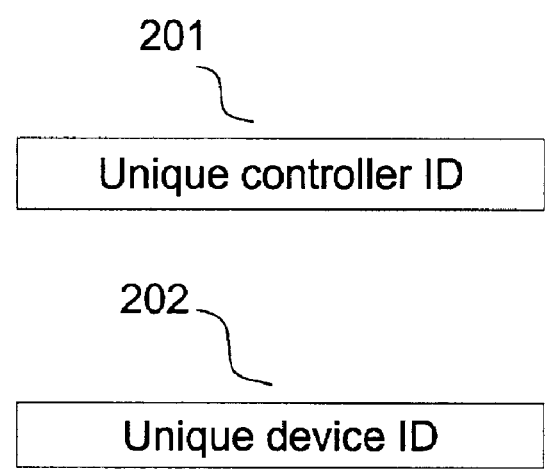

In an alternative embodiment illustrated in FIG. 2, all controllers and all devices have pre-set unique identifiers 201 and 202 written in a memory during fabrication and which cannot be altered. The controllers of the system must learn the unique identifiers from all devices to be controlled by the controller. Since all of these one-part identifiers are unique, there is no need for a system identifier.

Since a device is always addressed together with the designation of the system, the device identifier is an extension to the Home ID of the system for identifying the device within the system. The device identifiers, hereafter also designated the device IDs, are assigned to the devices by the controller when a device is incorporated in the system for the first time. The device identifier is stored in the controller and in the device itself. In order to minimize the use of frame space and also to reduce storage on the controller, the device identifiers identifying the devices has to be kept as small as possible.

Communication Protocol

All controllers and devices comprise at least parts of a common protocol for transferring and administering data within the system. The protocol administers identifiers and manages the addressing of frames for communication within the system.

In the first preferred embodiment, device identifiers are 8 bit values. As mentioned in the above, the device identifier is always used in relation to a Home ID in a frame in the communication protocol, thereby preserving the all-over uniqueness of a device. The size of the unique controller identifier, and thereby of the Home ID, has to have such a size that we would never run out of unique addresses. The controller identifier is therefore a 32 bit value giving up to 4294967295 unique Home ID's.

The communication protocol designed to overcome the usual problems seen in radio communication applications. The most common problem is noise, which can cause the data communicated between two devices to be lost or corrupted. The general rule is that the less data being transferred the bigger chance there is for a successful transfer.

In the prior art, the size of the frame format holding the data to be sent is not of very high importance, since it typically takes up a very small part of the total amount of data bits. However, in the present invention where the system is used to send short commands and instructions, the frame format often makes up a considerable amount of the data bits to be sent. Therefore, the general format of the frames used in the communication protocol of a preferred embodiment of the present invention, is designed to reduce the amount of data, i.e. to obtain a short frame, is to be able to send commands to more than one device in one single frame and to address these devices in a concise notation. Similarly, the commands comprised in the frame should also be minimized. The protocol designed for the present invention take these considerations into account in that it provides masking of device identifiers and commands as well as compression of data.

The devices to be controlled may perform several functions, which can be divided into types of functions:

Output; to provide an output such as a command, an instruction, a message or electrical power to an electric appliance connected thereto, e.g. a coffee machine, an oven, a surveillance system, a door lock, audio equipment etc.

Input; to receive an input from an appliance such as a sensor or an input unit such as a keyboard or a pointing device connected thereto and store, process and/or transmit the input. The controllers of the system can be programmed to respond to a signal from a device receiving input, e.g. activating a sound signal and calling security in case of a detected burglary.

Repeating; for repeating signals from a controller or from a device in order to reach devices outside the signal range of the transmitting controller or device.

A device can be separated unit connected to the appliance, or a device can be an integrated part of the appliance. A device can perform a function itself or it can permit, instruct or make capable an appliance connected to the device to perform a function.

The user interface of a controller allows the user to control each device controlled by the controller. The devices controlled by the controller can be ordered in different output classes so that two or more devices can be controlled together. Such output classes can be characterized by a set of variables such as:

| Output Class | Characteristic Variables | Comments |
|---|---|---|
| Output device Groups | Device ID<br>Group ID<br>Device ID | Consists of a device<br>Consists of several devices |
| Moods | Mood ID<br>Group IDs<br>Device IDs<br>Settings | Consists of several devices and/or groups and an individual pre-set setting for each device or group of devices. |

Groups are an output class consisting of several devices. This output class is utilized for controlling multiple output devices with one single command. Moods are essentially "groups of groups" and/or "groups of devices" in which each group and/or device has specific settings characterizing the operation of the devices and groups. For example, a mood can consist of devices connected to lamps in the living room and the settings could be a dimming level in the power supplied to each lamp by each device. By selecting this mood, all lamps in the living room can be dimmed to a predetermined level creating desired lighting for e.g. TV watching. The settings of devices or groups depend on the function performed by each device and are set individually for devices and groups. One device may belong to one or more groups and each Group may belong to one or more moods.

Frames

The communication protocol of the first embodiment has a general format for the frames carrying the instructions and information between the devices of the system.

The frame format according to the first embodiment can be described as:

TABLE 1

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| colspan Home ID (Low word) |
| Home ID (High word) |
| Version | Dir | | Type | | | | Source ID |
| Command | | | | | Length (bytes, ex. Checksum) |
| Data byte 0 | | | | | Command value |
| Checksum | | | | | Data byte n |

Wherein:

The numbers 0 through 15 represent a bit-scale giving the order and sizes of each part of the frame. The order in which the parts appear are not restrictive and different orders can be used.

Home ID (32 bit): The Home ID of the system in which this frame should be executed/received.

Source ID (8-bit): The identifier (second part of the two-part identifier) of the transmitting controller or device.

Version (3 bit): Protocol/frame format version. This gives the freedom to change the frame format according to an update of the software protocol or other infrastructure enhancements.

Dir. (1 bit): Direction of command; 0 when a command is issued, 1 when a command is acknowledged.

Type (4 bit): The type of frame decides the contents of the rest of the frame, whether the frame contains a command or e.g. a status, and how the designation of devices is carried out. The designation depends on which and how many devices should be addressed. Some examples of possible frame types are:

TABLE 2

Frame Types

| Type field | Type function |
|---|---|
| 0 (0000) | Invalid use |
| 1 (0001) | Command for a single device |
| 2 (0010) | Command for a group of devices |
| 3 (0011) | Command for a group of devices, masked (Device ID 1–8) |
| 4 (0100) | Command for a group of devices, masked (Device ID 9–16) |
| 5 (0101) | Command for a group of devices, masked (Device ID 1–16) |
| 6 (0101) | Command for a group of devices in same single mask range (*). |
| 7 (0111) | Command for a single device (repeat path) |
| 8 (1000) | Command for a group of devices (repeat path) |
| 9 (1001) | Command for a group of devices, masked (Device ID 1–8) (repeat path) |
| 10 (1010) | Command for a group of devices, masked (Device ID 9–16) (repeat path) |
| 11 (1011) | Command for a group of devices, masked (Device ID 1–16) (repeat path) |
| 12 (1100) | Command for a group of devices in same single mask range (*)(repeat path). |

*) Each mask range is in step of 8 consecutive devices in step of 8. Ex. Range 0 = 1–8, Range 1: 9–16

Length (8 bit): Amount of bytes in the frame starting from the first Home ID word until the last data byte without checksum field.

Command (8 bit): The command that should be performed. See examples of commands in Table 3.

Command Value (8 bit): The actual value of the issued command. Typically an 8-bit value but may be longer depending on the command.

Data byte (0-n): The data contained in the frame.

Checksum (8 bit): Checksum calculated between Home ID and the last byte of the frame. The Checksum field itself is not in calculated.

In the following, some examples of information exceeding the general frame format that can be comprised in a frame are given.

The following table shows some examples of commands and command values that can be issued in a frame:

TABLE 3

| Command function | Command | Command Value |
|---|---|---|
| No Operation (NOP) | 0 | Non applicable |
| Toggle switch on | 1 | Non applicable |
| Toggle switch off | 2 | Non applicable |
| Start Dim | 3 | Dim Level to start from |
| Stop Dim | 4 | Non applicable |

TABLE 3-continued

| Command function | Command | Command Value |
|---|---|---|
| All Off | 5 | Non applicable |
| All On | 6 | Non applicable |
| Delete All Switches | 7 | Non applicable |
| Request Device Info | 8 | Non applicable |
| Set Dim | 9 | Dim Level |
| Enable repeat Path | 10 | Non applicable |
| Disable Repeat path | 11 | Non applicable |
| Set Device trigger level | 12 | Trigger Level |
| Get Device trigger level | 13 | Non applicable |
| Trigger alert | 14 | Trigger level |
| Perform calibration | 15 | Non applicable |
| Request status | 16 | Non applicable |
| Discovery | 17 | Device ID's from device table |

At least command values of command 22, 24, 25, and 26 will be longer than 8 bit. The communication protocol designates the length of command values for each command.

When issuing commands, it is off course important to specify which devices the command is addressed to. Depending on the number of devices to be addressed in one frame, different frame types, referring to Table 2, can be utilized. The following frame type comprises the command and the individual addresses, i.e. device identifiers, of a group of recipient devices.

TABLE 4

| 15 14 13 12 11 10 9 8 | 7 6 5 4 3 2 1 0 |
|---|---|
| Home ID (Low word) | |
| Home ID (High word) | |
| Version   Dir   0010, Type 2 | Source ID |
| Command | Length (bytes, ex. Checksum) |
| Number of Devices | Command Value |
| Destination Device ID 1 | Destination Device ID 0 |
| Destination Device ID 3 | Destination Device ID 2 |
| Destination Device ID 5 | Destination Device ID 4 |
| Checksum | Destination Device ID n |

Destination Device ID (8 bit): Array of 8 bit destination device identifiers indicating whether the receiving device should react to the command or not.

Masking

As can be seen in the above frame format, the addressing of devices makes up a considerable amount of the total data bits to be sent. It is an important feature of the communication protocol of the first embodiment of the present invention that it provides a way to reduce the addressing data bits. By using a Destination Device ID Mask in the frame format, the addressing data bits can be reduced dramatically. The masking of device identifiers is an operation that indicates whether certain of the receiving devices should react to the command or not. A register of entries, each entry corresponding to the enumeration of device identifiers, holds a bit pattern called a mask with each bit set to '1' where a corresponding device identifier is to be selected and '0' otherwise. By transmitting a frame with the frame type defining the mask range, see table 2, together with the "Destination Device ID Mask" (with each bit indicating whether the receiving device should react to the command or not), the addressing of each further only takes up 1 bit.

Three examples of masking of device identifiers are given in the following. The examples use mask sizes, types, indexing and layout according to the frame format of the first preferred embodiment of the present invention. Such masking can be carried out using other layouts and formats, and the first embodiment does not restrict the idea of using masking in the designation of devices for addressing groups of devices within any communication network.

First, with an 8 bit Destination Device ID Mask, up to eight devices with device identifiers from 1–8 can be addressed in a single byte reducing the amount of data dramatically. If eight devices should be addressed with the non-masked frame format (Command for a group of devices) the amount of data would be increased with 8 bytes (8 device identifiers and the "Number of Devices" field rather than the "Destination Device ID Mask").

TABLE 5

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| Home ID (Low word) ||||||||||||||||
| Home ID (High word) ||||||||||||||||
| Version | Dir | 0011, Type 3 ||||||| Source ID |||||||
| Command |||||||| Length (bytes, ex. Checksum) ||||||||
| Destination Device ID Mask |||||||| Command Value ||||||||
| Checksum ||||||||||||||||

Destination Device ID Mask (8 bit): 1 bytes destination device identifier mask with each bit indicating whether the receiving device should react to the command or not. The least significant bit (LSB) represents Device 1.

If we wanted to address devices in the range from 9–16 the only change in the frame format would be another value in the frame type field of the general frame format, namely 0100 from Table 2, the LSB in the mask would now be device identifier 9.

If the devices to be addressed all have device identifiers within the interval 1 to 16, the frame format should be of the "masked Device ID 1–16" frame type. Thereby, some, or all, of the first 16 device identifiers can be addressed in two bytes as shown in Table 6.

Destination Device ID Mask (16 bit): 2 bytes destination device identifier mask with each bit indicating whether the receiving device should react to the command or not. The least significant bit (LSB) represents Device 1.

Many systems in small households will have the most of its capacity covered by the 8 and 16 bit masks covering the first 16 devices. However, in large systems the devices to be addressed have device identifiers higher than 16, and depending of the number of devices, a more flexible masking procedure can advantageously be applied. Whereas the frame type field typically defines the devices corresponding to the mask, the frame type may also allow for a Mask Index range defining which 8 (or other number of) devices are covered by the following Destination Device ID Mask.

Each mask range covers 8 consecutive devices ID's in step of 8 (with the exception of frame type 5). In the frame type 6 frame format, a Mask Index (an 8 bit value) indicates which mask range the following Destination Device ID Mask covers. The mask ranges are numbered consecutively, hence Mask Index '0' indicates a Destination Device ID Mask ranging from device identifier 1 to 8. Mask Index of 1 indicates a Destination Device ID Mask ranging from 9 to 16. Using this method, device identifiers ranges up to Device ID 2040 (255*8) can be addressed

TABLE 6

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| Home ID (Low word) ||||||||||||||||
| Home ID (High word) ||||||||||||||||
| Version | Dir | 0101, Type 5 ||||||| Source ID |||||||
| Command |||||||| Length (bytes, ex. Checksum) ||||||||
| | | | | | | | | Command Value ||||||||
| Destination Device ID Mask ||||||||||||||||
| | | | | | | | | Checksum ||||||||

TABLE 7

| 15 14 13 | 12 11 10 9 | 8 | 7 6 5 | 4 | 3 2 1 0 |
|---|---|---|---|---|---|
| | | Home ID (Low word) | | | |
| | | Home ID (High word) | | | |
| Version | Dir | 0110, Type 6 | | Source ID | |
| | Command | | Length (bytes, ex. Checksum) | | |
| | Mask Index | | Command Value | | |
| | Checksum | | Destination Device ID Mask | | |

Mask Index (8 bit): The mask index indicates which device identifier ranges the Destination Device ID mask refers to.

Destination Device ID Mask (8 bit): 1 bytes destination device identifier mask with each bit indicating whether the receiving device should react to the command or not. The least significant bit (LSB) represents device identifier=Mask Index*8+1.

A masking procedure similar to the one described above can be applied to the commands issued to different devices. Thereby, several commands from a set of predetermined commands can be issued without providing the commands as such in the frame.

By providing tables of predetermined commands such as Table 3 in the protocol on both controllers and devices, the mask will be a register of entries, each entry corresponding to the enumeration of commands, forming a bit pattern with each bit set to '1' where a corresponding command is to be selected and '0' otherwise. The command values of Table 3 can be subject to a similar masking.

In order to further reduce the size of frames, data such as arrays of measured input values, images or text strings such as program strings can be subject to data compression. The protocol can apply typical software digital data compression archive formats such as Zip, gzip, CAB, ARJ, ARC, and LZH.

Acknowledgement

Data transmission using an RF carrier frequency in a typical home environment creates the possibility of transmission failure and introduction of spurious errors. The sources for introduction of errors include RF noise from other RF transceivers and electrical apparatus in general. The system of the present invention uses two-way RF components making it possible to get acknowledgment back from devices after a transmitted command has been received and/or executed. This procedure is outlined in the flow diagram of FIG. 3. After the device has generated and sent the frame, it waits for acknowledgement from the device(s) receiving the frame. If the transmitting device has not received an acknowledgement within a specified time, it will retry the data transmission until the data has successfully been transferred or a maximum of retries has been reached.

When a frame has been received, the receiving part is prompted to acknowledge the reception by the communication protocol. The receiving device returns only the frame header with the D bit set. When the D bit is set, all devices read the frame so that the Source ID is considered Destination ID.

TABLE 8

| 15 14 13 | 12 11 10 9 | 8 | 7 6 5 | 4 | 3 2 1 0 |
|---|---|---|---|---|---|
| | | Home ID (Low word) | | | |
| | | Home ID (High word) | | | |
| Version | 1 | 0011, Type 3 | | Source ID | |

Figure 3:
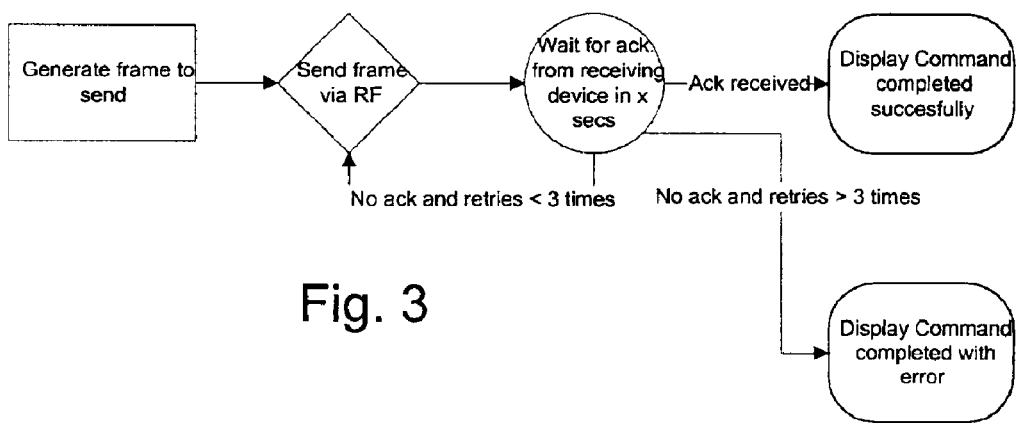
FIG. 3 is a flow chart illustrating the procedure for transmission and acknowledgement of a command according to the first preferred embodiment of the present invention.

As illustrated in FIG. 3, the controller sends the signal up to 3 times if it have not received acknowledgements from the receiving device (a repeating device or destination device).

Routing

Figure 4:
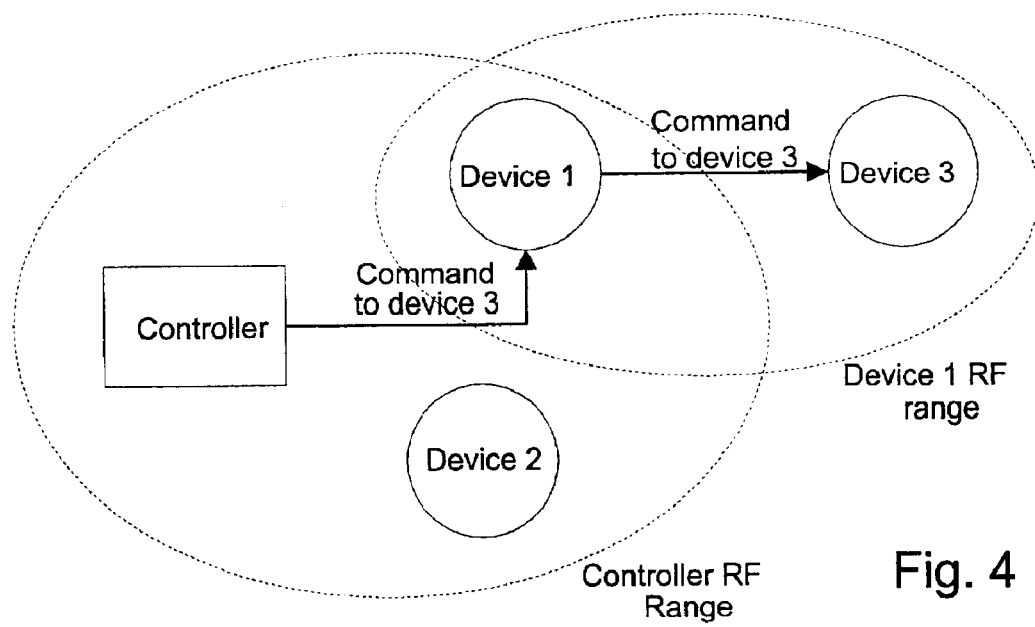
FIG. 4 illustrates the principle of routing a signal from a controller to a device which is outside the range of the controller.

According to the present invention, the communication protocol of the first preferred embodiment has a routing functionality designed to solve a situation where a device in a network can not be reached directly by the controller that needs to send command signals to it. The problem is solved by letting one or more devices in the network act as repeaters so the command signal can reach the destination device. This principle is illustrated in FIG. 4, where device 3 is outside the RF range of the controller, wherefore device 1 acts as a repeater for the command signal to device 3.

In order to provide a high quality in the automation system of the first preferred embodiment, the following points has acted as quality requirements for the performance and the design of the routing functionality:

The router functionality should enable a controller to reach devices outside its normal RF range as well as devices within its range where the signal path is blocked or interfered.

The devices in a network will usually have very limited memory capacity and CPU power, so the intelligence in the routing process should be in the controllers.

Routed frames must be acknowledged in order to have the same reliability as for non-routed frames.

Routing and repeating must take place without user intervention because understanding about network setup can not be expected by a user.

In order to render the routing functionality possible, signal repeaters are applied in the system. According to the first preferred embodiment, all devices are as a starting point adapted to act as repeaters if instructed so by a controller. This dual functionality of devices provides a very reliable and flexible network with an improved range/coverage and is the subject of the international patent application PCT/DK01/00253 (publication number not presently available). However, exceptions can be made for devices for various reasons, e.g. if a device is a transportable device which changes position in the network on a regular basis, it will not be suitable as a repeater, or if a device is battery powered it can be excepted from repeating in order to save battery power. However, the routing functionality of the present invention is not limited to systems wherein all devices are adapted to act as repeaters, it can just as well be applied in systems with dedicated repeater devices.

The routing functionality is a set of functions which, among other things, allows the controller to:

- build a routing table indicating for each device, other devices which the device can successfully transmit signals to and receive signals from,
- for a given entry point and a given destination device, determine a route of repeater devices from the entry point to the destination device and generate a signal which will be repeated along the determined route,
- learn where its typical locations in the network is, which allows the controller to make educated guessing when determining an route to and end device outside its range.
- determine devices which are central in the network in that any device in the network can be reached using those devices, which allows the controller to more efficiently determine a route to a given destination device,
- determine when the network topology has changed and automatically updating the routing table etc.

Frame with Repeater List

When generating a signal to be routed to a destination device, the frame must in some way designate the repeater devices in the route.

The routing functionality in a device is responsible for receiving a routed frame and determine if it should be repeated, and then send it out again. Since the communication protocol is designed to work on RF media, it is important that only one device transmits at a time, therefore only one device must repeat a frame. This is accomplished by having a repeater list in the frame, which designates the repeater identifiers being the device identifiers of the devices used to route the signal to the destination device. The repeater list consist of the following fields:

TABLE 9

| 7 | 6 | 5 | 4 | 3 | 2 | 1 | 0 |
|---|---|---|---|---|---|---|---|
| | | | Route Status | | | | |
| Repeaters | | | | | Hops | | |
| | | Repeater Device 0 Address | | | | | |
| | | Repeater Device 1 Address | | | | | |
| | | Repeater Device 2 Address | | | | | |
| | | Repeater Device 3 Address | | | | | |

The following frame type comprises the command, the destination identifier of the addressed device, and the repeater list.

Hops (4 bit): 1 byte field indicating how many repeaters the frame has passed through. This could be used by the repeaters as an index into the repeater ID's and to see whether they have to forward this frame or not.

Number of repeater (8 bit): The amount of repeater ID's in the frame.

Repeater ID (8 bit): 1 byte repeater ID indicating which devices the frame should pass through. The Hops field can be used as an index into the repeater ID list The repeater specific fields (Route Status, Hops, Number of repeaters, and repeater ID's) can be applied to all the above-mentioned frame types specified in Table 2 and will also be used in the acknowledgement of received frames. The masking procedure described in relation to Tables 5 through 7 can also be applied when a large number of repeater identifiers are included in a frame.

Figure 5:
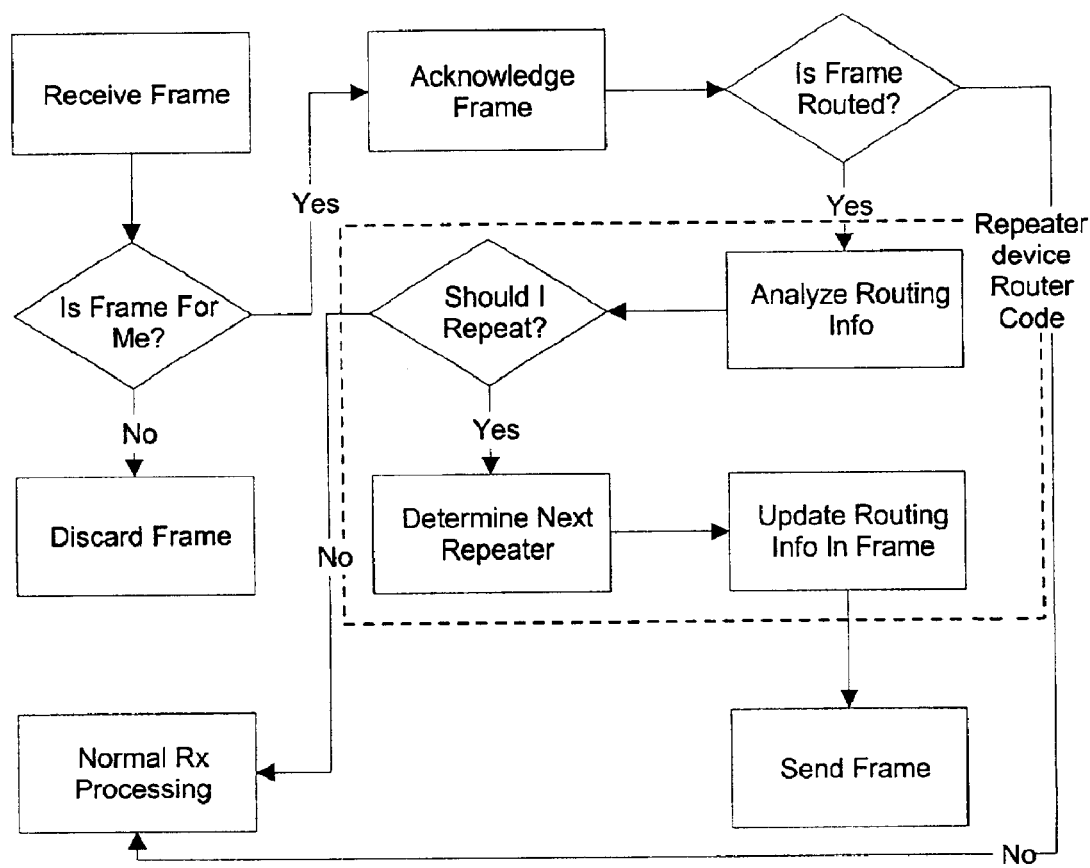
FIG. 5 is a flow chart illustrating the procedure for routing of a frame in a device.

FIG. 5 is a flowchart for a program held by the processing unit of each device, illustrating the procedure for routing a signal. The procedure determines whether the frame of the signal is relevant for the device at all, i.e. whether it is designated as destination or repeater device, if the frame is relevant the device should acknowledge the reception of the frame. The processor of the device looks at the routing list in the frame to analyse the routing info and determine whether it is designated as destination or repeater device. If it is designated as repeater device, it looks at the Repeater Device ID pointed to by the Hops field and if it matches the devices identifier it increases or decreases the Hops counter depending on the direction bit in the frame header. Finally, the device transmits the frame again. If the device is designated as destination device, the device processes the instructions and/or information in the frame.

Figure 6:
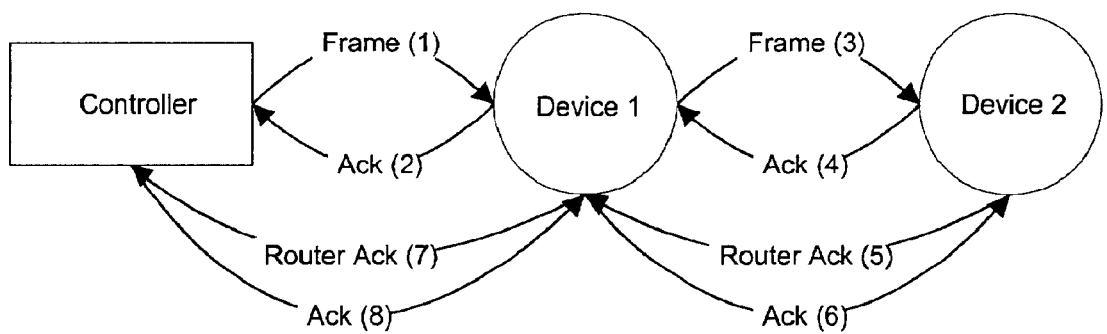
FIG. 6 illustrates the principle of acknowledging reception of signals according to a first preferred embodiment of the present invention.

The repeater devices are only responsible for sending the frame to the next repeater in the repeater list, after the next repeater has acknowledged the frame it is the responsibility of that repeater to send the frame further on. When the frame reaches the destination device, a router acknowledge is send all the way back to tell the controller that the frame has reached its destination. A router acknowledge is just a routed frame without data where the acknowledge bit in the route status is set. The frame flow of a routed signal and its acknowledgements is illustrated in FIG. 6, where Frame (1 and 3) are the routed frames, Ack (2 and 4) are normal acknowledgements, Router Ack (5 and 7) is the router acknowledgement which is routed back to the controller, and Ack (6 and 8) are normal acknowledgement signals acknowledging reception of the routed acknowledgement signals.

Building Routing Table

To be able to generate the repeater list to a frame, an automated process is performed to determine a route to a specified device from any entry point in the system. It is important that the amount of repeaters in a route is kept to

TABLE 10

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| | | | | | | | Home ID (Low word) | | | | | | | | |
| | | | | | | | Home ID (High word) | | | | | | | | |
| Version | | | Dir | | 0111, Type 7 | | | | | Source ID | | | | | |
| Command | | | | | | | | Length (bytes, ex. Checksum) | | | | | | | |
| Destination Device ID | | | | | | | | Command Value | | | | | | | |
| Number of Repeaters | | | | Hops | | | | Route Status | | | | | | | |
| Repeater Device 1 ID | | | | | | | | Repeater Device 0 ID | | | | | | | |
| Checksum | | | | | | | | Repeater ID n | | | | | | | | a minimum in order for the response time to be as low as possible and the reliability to be as high as possible. For this purpose, the controller builds a routing table by scanning all devices in network, asking them which other devices they can reach.

Figure 7:
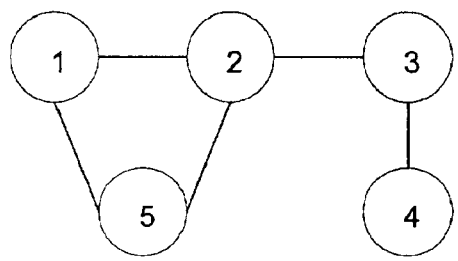
FIG. 7 illustrates an example of a network topology of an automation system.

The routing table is where a controller keeps the information from the devices about the network topology. The table is an N×N field table where all information about what devices that can see each other is kept. FIG. 7 illustrates a network topology with devices 1 through 5 and Table 11 shows its routing table.

TABLE 11

|   | 1 | 2 | 3 | 4 | 5 |
|---|---|---|---|---|---|
| 1 | 0 | 1 | 0 | 0 | 1 |
| 2 | 1 | 0 | 1 | 0 | 1 |
| 3 | 0 | 1 | 0 | 1 | 0 |
| 4 | 0 | 0 | 1 | 0 | 0 |
| 5 | 1 | 1 | 0 | 0 | 0 |

The routing table is common to the whole network and may be shared between different controllers in the system. The function of sharing information between controllers in the system is the subject matter of the international patent application PCT/DK01/00252 (publication number not available at present) by the applicant.

A full network scan as performed according to the prior art is a complicated and time consuming process. The controller sends a broadcast signal which is received by devices within its range, instructing these to, in dedicated time slots, send a broadcast signal received by devices within their range and so on. Also, the devices has to report back to the controller with information from which the controller can build the routing table. Such a full network scan blocks the network for a long time and uses a lot of battery power and should therefore be avoided.

Instead the system according to the present invention scan devices individually and without broadcasting signals and only when necessary, such as in the case of new devices, devices that it has found a problem with or which qualify in other ways.

Discovery

Figure 8:
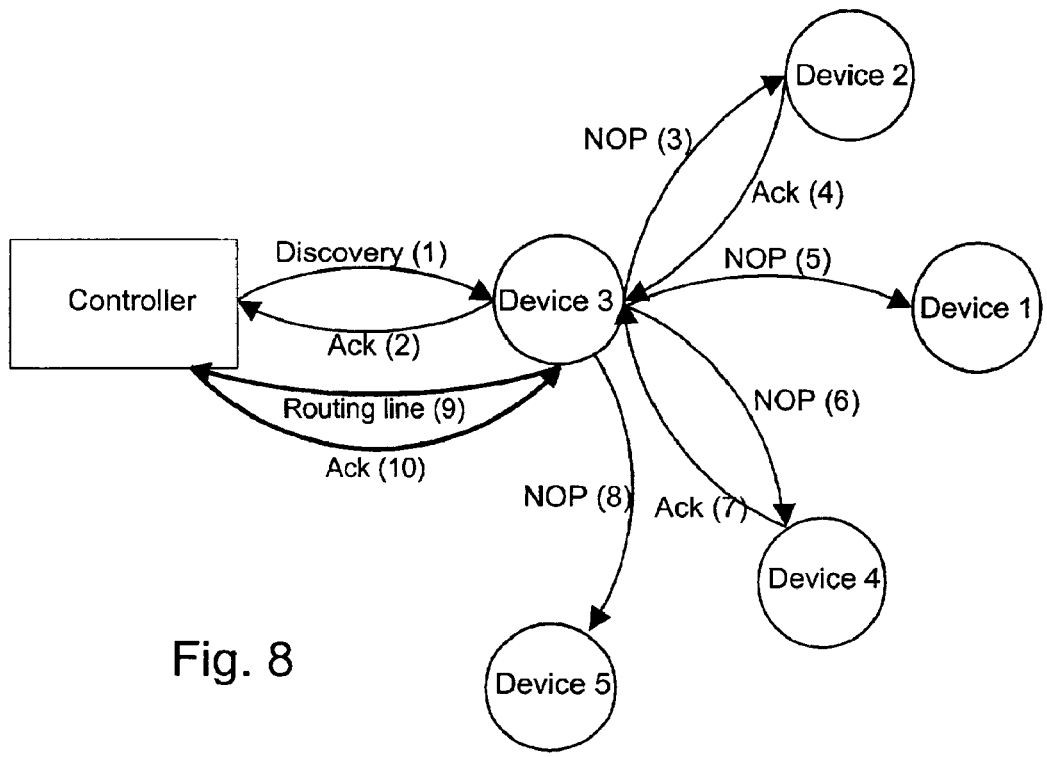
FIG. 8 illustrates the principle of performing a discovery procedure according to a first preferred embodiment of the present invention.

In order to discover the network topology of its region, each device is adapted to, upon instructing from a controller, perform a discovery where it discovers other devices in its vicinity which the device can successfully transmit signals to and receive signals from. The discovery procedure is illustrated in FIG. 8 which and is performed by a program held by the processing unit of each device. It is performed by sending a discovery command signal (1) to a device telling it what other devices it should look for. After sending an acknowledgement signal (2), the device will send NOP (No OPeration, an "empty" signal) command signals (3, 5, 6, and 8) to the devices specified in the discovery command signal (1) one by one and wait for acknowledgement signals (4 and 7) from devices which received the NOP commands. In the topology shown in FIG. 7, devices 2 and 4 will respond to device 3 with an acknowledgement signal while device 1 and 5 will not. The processing unit of the device will then store the identifiers of the devices which acknowledged the NOP signals in the memory of the device. The information representing the other devices which the device can successfully transmit signals to and receive signals from can be send in a signal (9) to the controller.

According to the first preferred embodiment, the discovery command signal (1) is a frame type 1 with a command 17 (see Tables 2 and 3) comprising a bitmask similar to the Destination Device ID Mask described in relation to Tables 5 and 6, which tells the device what other devices it should look for. Also, when the devices have received acknowledgement signals (4 and 7) from other devices within its signal range, it sets corresponding bits in another bitmask in its memory, this bitmask is ordered similar to a line of the routing table in the controller and is therefore called a routing line. The routing line signal (9) can be send to the controller after it is formed, i.e. when the device has either received an acknowledgement signal from device 5 or send the NOP signal (8) three times to the last device in the bitmask of the discovery signal (1).

Upon reception of the routing line signal (9), the processing unit of the controller is adapted to update (overwrite an existing line and column) or extend (add line and column corresponding to the new device) the routing table. The routing line can be stored directly in the routing table since it has been written in the appropriate format in the device.

The controller performs the functions of keeping track of the network topology, maintaining a routing table, and calculating the shortest route to a device. A controller can also have the router functionality of a device, but that is optional because a controller will typically not have the power supply to be in receiving mode all the time.

As described in the above, the controller keeps track of the network topology by asking all devices in the network about what devices they can reach using the discovery command. Typically, the devices does not move very often, so the controller will be triggered to instruct a device to perform a discovery only at certain times. The best times to perform a discovery depend to some extend of the function that each device performs and upon the specific ordering of devices in the system. For example, the triggering of a discovery for a device may be different for devices in automation systems in private home and for alarm or security systems for industrial plants or hospitals. Also, devices may be ordered differently than in groups and moods as is the case in the first preferred embodiment.

Optimally, the controller is triggered to instruct a device to perform a discovery when the device is first introduced in the system and every time the device is moved. However, in the first preferred embodiment, another scheme is chosen. In the first preferred embodiment, the controller is triggered to instruct a device to perform a discovery when:

It is introduced into the system for the first time the controller assigns a device identifier to it, or equivalently, when it is added to a group for the first time.

it has been removed from a group or a mood and it is later added to a group or a mood.

Figure 9:
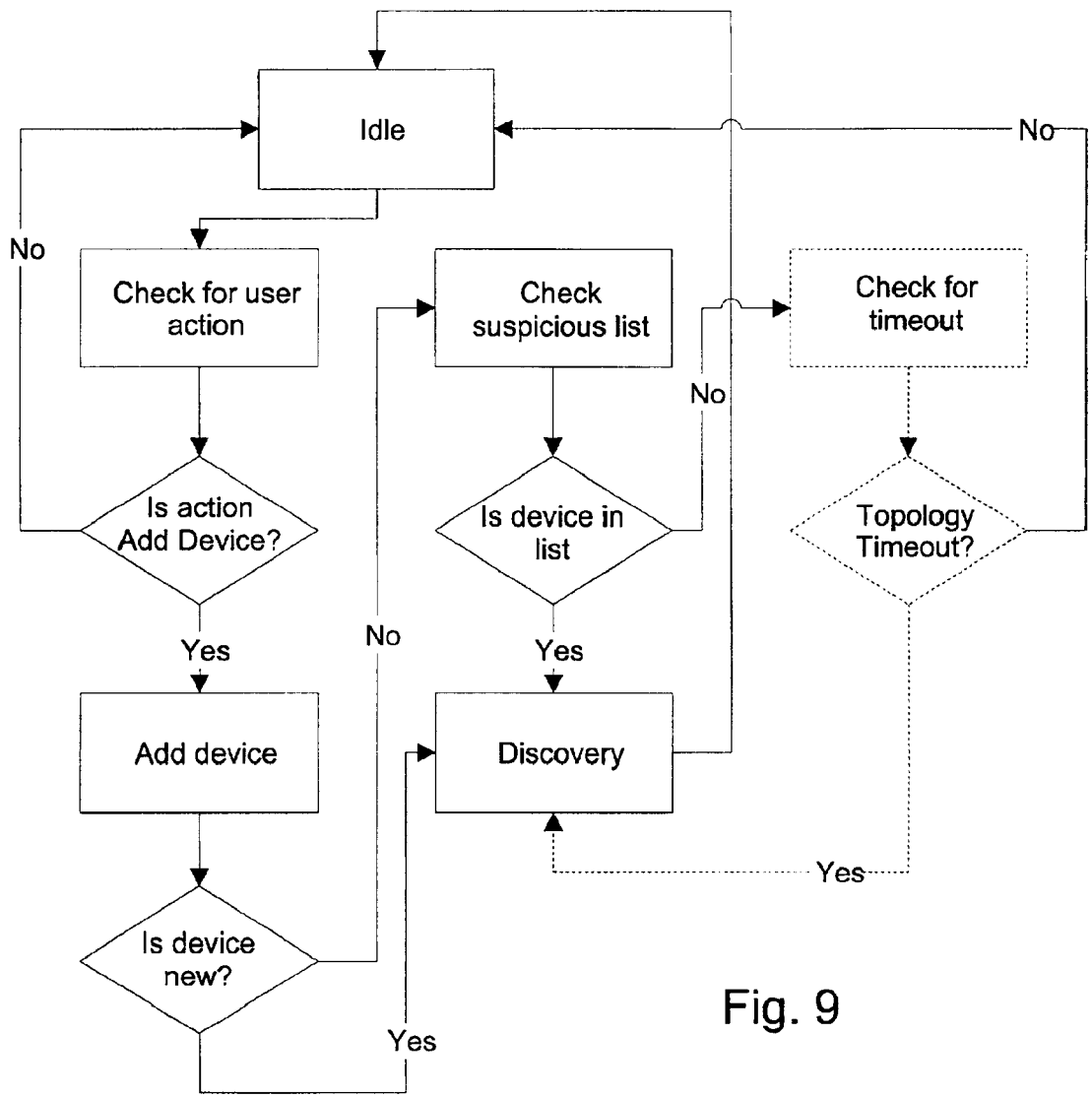
FIG. 9 is a flow chart illustrating the procedure for triggering a discovery procedure according to a first preferred embodiment of the present invention.

To implement this way of triggering, a device will be marked as "suspicious" when its configuration is changed such as when it is removed from a group or a mood. The next time the controller talks directly to a suspicious marked device, the controller will be triggered to instruct a device to perform a discovery. FIG. 9 is a flowchart for a program held by the processing unit of each controller, illustrating the procedure for triggering a discovery. A device will be excluded from the Routing Table while it is marked as suspicious until it has performed a discovery. The marking may simply be a bit which is set in the device table or it may be a dedicated "suspicious devices list" to which the identifier of the device is added. This method is chosen because a device is typically moved a good distance (such as more than 5 meters) before it has an impact on the network topology, and if it is moved that much, the user will often also change the group and/or mood configuration for that device.

Optionally, the controller is also triggered to instruct a device to perform a discovery when the device is moved, which will require a routine to determine when a device is moved or that the user remember to instruct the device or a controller that the device has been moved. Also, if a device, a specified number of times, has been designated as repeater device in a route which failed to route a signal to the destination device, the controller can be triggered to instruct the device to perform a discovery. Alternatively, each line in the routing table can be given a time stamp, and after a specified time, the line expires and the corresponding device is marked as "suspicious". This will ensure a regular maintenance of the routing table.

Figure 10:
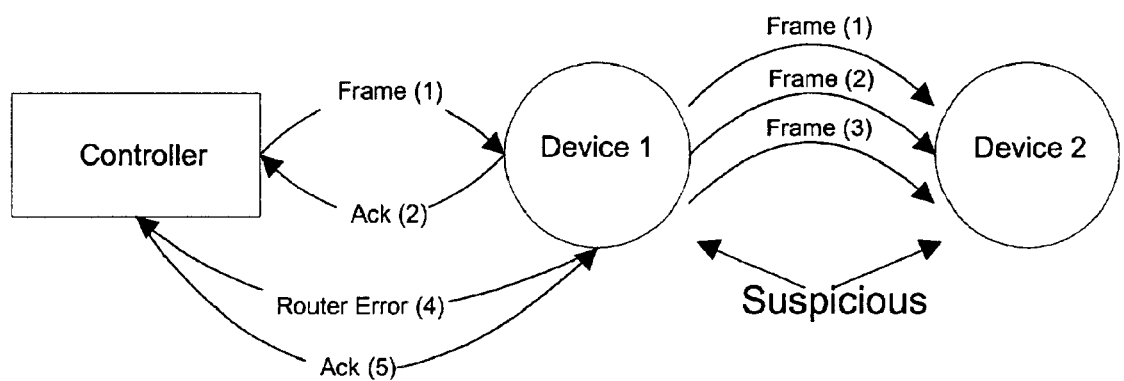
FIG. 10 illustrates the principle of adding devices to a suspicious device list when a transmission fails.

Another way to find out that a device has changed position in the network is to make the repeating devices in a route return a route error frame if the device can not reach the next repeater in the repeater list of the routed frame. This situation is illustrated in FIG. 10. It is not always possible to determine if the device that has changed position it the one that send the error, or if it is the next device in the repeater list, so this method would generally require that two devices would be marked as "suspicious" when one device has changed location.

Another method to ensure that the routing table is always up to date is to impose a rule on the user saying that a device should always be reset when it is moved. That way a device that is moved will always be removed from the routing table when it is reset and inserted again when it is added to the controller again.

Most Used Entry Point List

A controller the system is typically small and battery powered, portable, handheld device which can change position in the network all the time. In real life usage, however, it is more likely that the controller will move around within a limited area (e.g. few rooms or one floor) for most of the time. This fact can be used to make educated guesswork when trying to determine its position in the network when determining a route to a given destination device outside its range. By registering successful and failed transmissions and performing statistical analysis on this data, the controller can learn it most probable position in the network. Therefore a list of the most used entry points into the network is maintained in the controller. The Most Used Entry Point List consists of a table holding device identifiers of devices and counters telling the transmission history for each device. The counter for a device is increased for each successfully received frame and decreased for each unsuccessfully sent frame. More specifically, the counter for a device is increased for each non-routed acknowledgement signal it receives from the device, no matter whether the device acknowledged as a repeater device or as a destination device. Similarly, the counter for a device is decreased for each time the controller has send a signal three times without receiving an acknowledgement signal, no matter whether the device was designated as a repeater device or a destination device. When an entry in the tables has a count value of 0 it is considered as empty, and can be replaced by a new entry. The table typically holds only a limited number N of possible entries.

TABLE 12

| Most used entry point table | |
|---|---|
| Device | Count |
| 2 | 10 |
| 3 | 0 |
| 5 | 15 |
| 1 | 1 |
| — | — |

The Most Used Entry Point List saves a lot of time and power since the controller does not have to start all over again when trying to determine its position in the network when routing is required. If a controller on a regular basis finds itself in two distant positions in the network, the Most Used Entry Point List will contain devices from both these positions. Also, if a controller, after having spent a long time within a limited area of the network, is moved to a different, distant position, the Most Used Entry Point List will take some time to update itself and will not provide efficient entry points for the first period of time.

Obviously, the Most Used Entry Point List will be specific to each controller in the system, and it does usually not make sense to share the Most Used Entry Point List between controllers.

Preferred Repeaters List

Some devices are positioned more central in the system than others, these centrally positioned devices are particularly suitable as repeater devices since they can typically reach many other devices. Since it will very often be a waste of time to try to route a signal through a device positioned at the network perimeter, a controller is programmed to make educated guesswork when determining an efficient route to a given destination device. Therefore, a list of preferred repeaters is calculated from the routing table, and kept in the controller for use in finding a route to a device. The preferred repeaters are chosen in the system in such a manner that they are the only devices necessary to reach any devices in the network. The Preferred Repeater List is a bitmap table where a bit at a position designates whether a device corresponding to the position is a preferred repeater. The list is re-calculated each time the routing table is changed.

TABLE 13

| Preferred repeater list for FIG. 7 | | | | |
|---|---|---|---|---|
| 0 | 1 | 1 | 0 | 0 |

In the network topology shown in FIG. 7, device 2 and 3 would be preferred repeaters, because together they can reach all devices in the network. The Preferred Repeater List is characteristic to the routing table and thereby to the network topology. The Preferred Repeater List is therefore common to all controllers in the network, provided that they all have an updated Routing Table.

The following is pseudo source code giving a procedure for determining the Preferred Repeater List from the Routing Table. The function AnalyseRoutingTable( ) Finds the repeaters in the network that are necessary for reaching all devices and builds the Preferred Repeater List. The function analyses the routing table based on a method where repeaters are chosen according to how many new device they can reach in the network.

```
Function AnalyseRoutingTable(void)
{
    clear old preferred repeaters list
    for x=1 to x=max_devices
    {
        new_devices = 0
        old_devices = 0
        if device x exist
        {
            for y=1 to max_devices
```

-continued

```
{
    if x can see y
    {
        if y is already a repeater
        {
            no new repeater found try next x
        }
        new_devices = number of new devices y can see
        old_devices = number of old devices y can see
        if new_devices > previous new_devices and
        old_devices > 0
            new_repeater = y
    }
    }
    add new_repeater to preferred repeaters list
}
}
return number of repeaters in repeater list
}
```

Determining Route to Device

Figure 11:
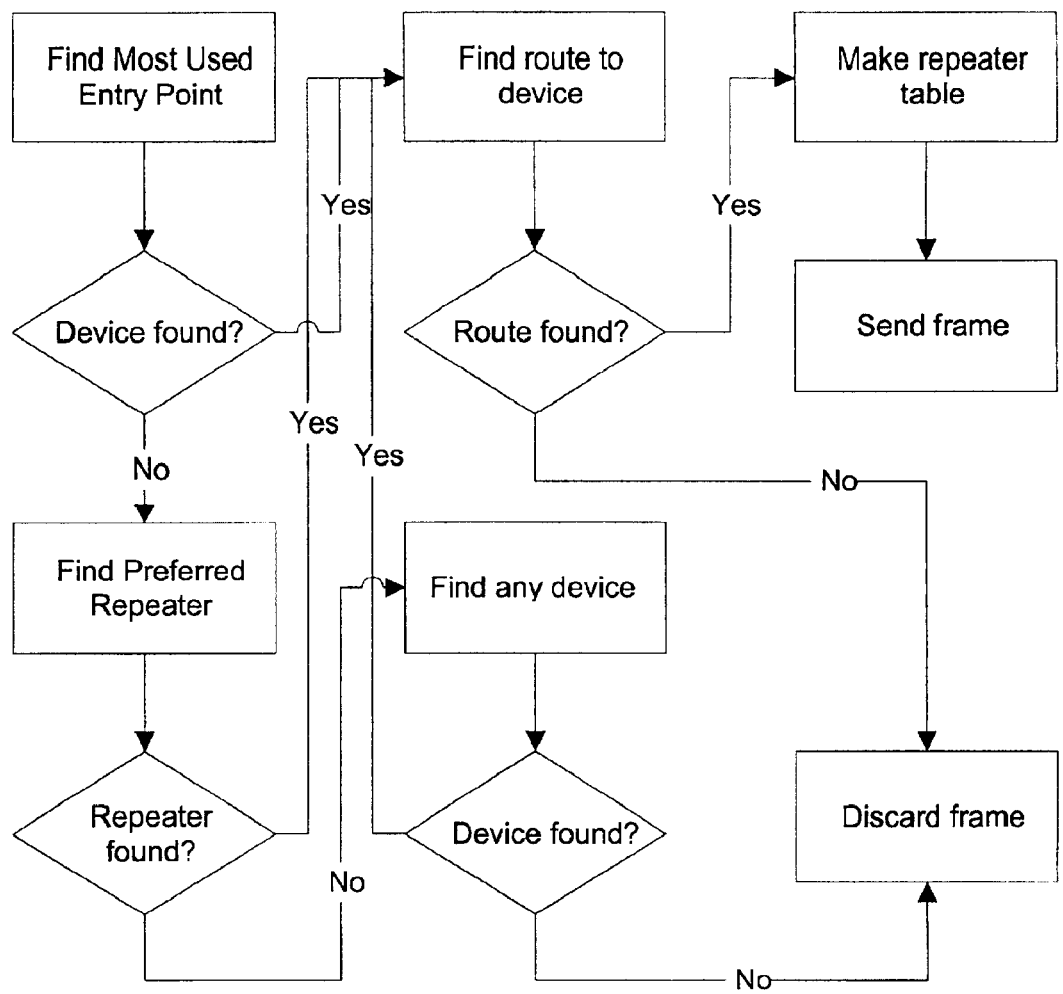
FIG. 11 is a flow chart illustrating the procedure for determining a route to a given destination device according to a first preferred embodiment of the present invention.

When a controller is instructed to send a signal to a given device, it will first send the signal directly to the destination device without routing. If no acknowledge is received, the controller will determine a route to the device, which requires several steps. FIG. 11 is a flowchart for a program held by the processing unit of each controller, illustrating the procedure for determining a route to a given destination device. The procedure described in the following paragraphs is outlined in FIG. 11.

First the controller must determine where in the network it is positioned. In order to limit the time it takes for the controller to find out where it is in the network, it utilises the Most Used Entry Point List to make an educated guess. Using the first device from the Most Used Entry Point List as an entry point, it will calculate the shortest route to the destination by doing a width first search in the routing table. Finally the controller will build the routing list (see Table 9) in the frame and sends it. If no routing acknowledgement signal is received from the destination device, the controller tries the next most used entry point etc.

If the controller can not reach any of the most used entry points (Device found?=No in FIG. 11), it will use devices from the Preferred Repeater List as entry points and calculate the shortest route to the destination using the Routing Table. If the controller can not reach a any of the preferred repeaters (Repeater found?=No in FIG. 11), it will try to look for any other devices in the network. The last possibility should be avoided because it will give a long response time.

The method for finding a route as described in the above is particularly applicable in systems with portable controllers (remote controls), since it works very efficiently for portable as well as stationary controllers. A stationary controller will build a very efficient Most Used Entry Point List, but will, as a first try, send signals directly to destination devices which are clearly outside its range. Controllers which are used as stationary controllers optionally has a setting which instructs them to, as a first try, find a route using a device from the Most Used Entry Point List as an entry point, unless the destination device is a device from the Most Used Entry Point List.

The following is pseudo source code giving a procedure for determining the route to a device given the entry point device identifier and the destination device identifier. The function The function FindBestRouteToDevice( ) finds the best (shortest) route from a starting point to a destination device. The functions calls the width first search function FindLastRepeater that finds the best repeater nearest to the destination, and the number of hops to that repeater. The function is then called with the new repeater as destination until the full path is found.

```
BYTE FindBestRouteToDevice(BYTE Routing, BYTE EntryPoint, BYTE
Destination)
{
    set new_destination equal to Destination
    while (hops left to find)
    {
        hops_left = FindLastRepeater(Routing, EntryPoint,
        new_destination)
            save max hops count
            if all hops found
            {
                insert hops and hops count in Routing
                return max hops count
            }
            set new_destination equal to the found repeater
    }
    return path not found
}
```

FindLastRepeater( ) finds the best route to a device based on the entry point repeater and destination device, it is only the last repeater that is found because it isn't possible to record the path through the network when using a width first search algorithm.

```
BYTE FindLastRepeater(BYTE Routing, BYTE EntryPoint, BYTE
Destination)
{
    if EntryPoint can see Destination
    {
        Routing = EntryPoint
        return 1
    }
    nextleve = list of devices EntryPoint can see
    while (device not found and max hops not exceeded)
    {
        for device=1 to max_devices
        {
            if device in nextlevel and device can see Destination
            {
                Routing = device
                return loop count
            }
        }
        nextlevel = all devices that the devices in nextlevel can see
    }
}
```

In an alternative embodiment, the strategy for determining a route can depend on the acknowledgements received by the controller during its previous attempts. If a controller does not receive a routed acknowledgement from the destination device, the entry point might still have received and re-transmitted the signal, in which case the signal stopped somewhere else in the route. In some environments, e.g. factories and workshops, two devices within range of each other may be shielded by metal objects and the like which is moved around within the building. Hence, even though the devices have not moved and should be able to communicate according to the routing table, their connection might temporarily be cut off. In the case where the controller receives an acknowledgement from the entry point device, but does not receive a routed acknowledgement from the destination device, a new route with the same entry point can be determined. It is a simple task for the person skilled in the art to use the routing table to determine an alternative route, if one exists, between two devices. This "new route using same entry point" strategy may sometimes be more efficient than the "new route using new entry point" strategy described in the previous sections. If the controller is in a position in the network where it can only reach one device, it must use this one device as entry point device. If the signal is stopped somewhere on the first route through this entry point device, the system should determine an alternative route which in this case must be an alternative route using the same entry point device.

Optionally, a combination of the two strategies "new route using new entry point" and "new route using same entry point" can be used where, after having tried one or more alternative routes using the same entry point, the controller may go to the next entry point in the list (Most Used Entry Point List or Preferred Repeater List).

In another alternative embodiment, the routing table is distributed to all devices in the system so that device themselves, when receiving a signal with a given destination identifier, can find a route and build the corresponding frame to the given destination device.

The user interface administers setup of the system by the user, and hence allows for the user to perform functions such as learning of new devices, setup of groups and moods, updating shared information between controllers etc, some of which will be described in the following. These functions are performed by programs or routines stored in the processing unit of the controller.

Learning of New Devices

The system according to the first preferred embodiment is very flexible and additional devices can easily be added as time goes by. When a new device is added to the system it has to know which Home ID and Device ID to use. This procedure requires only three actions by the user, using only the device to be installed and any one controller. Everything else is taken care of by the system, and does not involve or affect any other controller or device in the system. In the first preferred embodiment, the system learns the presence of the new device and assigns a device identifier in an automated process following the process steps (see also the flowchart of FIG. 9, illustrating for a program held by the processing unit of each controller):

1. The user sets the controller in a learning programming state where it listens to all signals, not only to those with the correct home ID.
2. The user presses and holds a button on the device.
3. The device sends request for Home ID and Device ID to listening controller as mentioned in 1.
4. Device awaits frame with Home ID and Device ID from controller.
5. Controller looks up next available device identifier and sends Home ID and allocated Device ID to device.
6. Device stores the received Home ID and Device ID in non-volatile memory.
7. The new device is added in the device table and a discovery commands signal is send to the device with a list of the devices already in the system.
8. The new device may be added in one or more groups and moods and may be named.

In the alternative where the device is programmed with a unique device identifier from factory, the process will be somewhat simpler:

1. The user sets the controller in device programming state, and is requested to specify which group the new device should be placed in.
2. The user presses and holds a button on the device whereby the device sends its device identifier to listening controller as mentioned in 1.
3. Device awaits frame with Home ID from controller.
4. Controller sends Home ID to device.
5. Device stores the received Home ID in non-volatile memory.
6. The group table in non-volatile memory on the controller is updated with the new device identifier.
7. A discovery commands signal is send to the device with a list of the devices already in the system.

The simplicity of this procedure is due to the unique addresses of all devices in the system. Since all devices can be addressed individually and due to the functionality of the protocol, each device can be set up and included/excluded individually.

If the device is already within the device table of the controller, but have to be added to a new or existing group, the procedure comprises the following steps (see also the flowchart of FIG. 9, illustrating for a program held by the processing unit of each controller):

1. The user sets the controller in group programming state and the user is requested to specify which group the new device should be placed in.
2. The user presses and holds a button on the device.
3. The device sends its device identifier to listening controller.
4. Controller stores the received device identifier in the selected group table.
5. The controller check whether the device is in the Suspicious Devices List, and if, sends a discovery commands signal to the device with a list of the devices already in the system.

The learning processes outlined above may be organized differently, however it is important for the overall functionality of the system that the device and the controller themselves (assign and) learn each other's ID's. Devices can belong to several groups, and a single device is inserted in a group by adding its device identifier to the relevant group table in the controller memory, hence without influence for any other devices at any time.

Data Structure in Controller

In order to keep the signals as short and few, the system according to the first preferred embodiment is optimized to operate as simple as possible without loosing quality in terms of reliability, range/coverage, versatility, and flexibility. In the following, the data structure of the controller, which allows for sharing information and performing functions in the most appropriate and efficient manner, is described.

Device Table

This table holds information on all the devices, which are currently installed in the complete system. This table is also used to assign device identifiers to new devices in the system. This table may also contain information about the characteristics or fixed settings of the different devices.

Group Table

This table holds information on which devices from the Device Table that are grouped together in which group. This table also holds information on the current setting of the specific group.

Mood Table

The Mood Table holds information on which groups and devices are members of the specific Mood and it also holds the specific settings of each device in the mood.

Group and Mood Name Tables

These two tables contain the user-defined alphanumerical names for the different groups and moods.

Controller Table

This table holds information on all controllers presently in the system, and optionally also the date and time of the last learning from another controller. This table could also contain information about the characteristics of the different controllers.

Routing Table

Table indicating for each of the plurality of devices, other devices which each device can successfully transmit signals to and receive signals from.

Preferred Repeater List

A list indicating one or more devices which together can route a signal to any device in the routing table.

Most Used Entry Point List

An ordered list indicating the device identifiers of the number, N, of devices that have successfully received most signals form the controller.

Trigger Action Table

This table holds information about which actions to take when a trigger level on one or more of the input devices has been reached.

Event Table

This table is similar to the Trigger Action Table. It holds certain events in the form of small programs, which is executed when predetermined conditions are fulfilled. Examples are turning on the coffee machine or car heater when a certain time has been read from the timer.

Program Table

This table holds large programs, macros or routines to be executed on command.

Power and Lighting

In a second preferred embodiment, also referred to as Power & Lighting control, the system comprises a set of products for controlling the power level to electric appliances connected to the devices, such as lamps, air conditioning, and kitchen appliances.

Apart from being a Power & Lighting control system, the system of the second preferred embodiment is to form a base for a complete home control system including other subsystems such as HVAC control, alarm system control, access control, etc.

The automation system of the second preferred embodiment is built on the same platform as the automation system of the first preferred embodiment. Thus, the description of the second preferred embodiment is a more detailed description of several of the functions described in relation to the first preferred embodiment, and it is assumed that the features described in relation to the first embodiment are also valid in the second embodiment.

Figure 16:
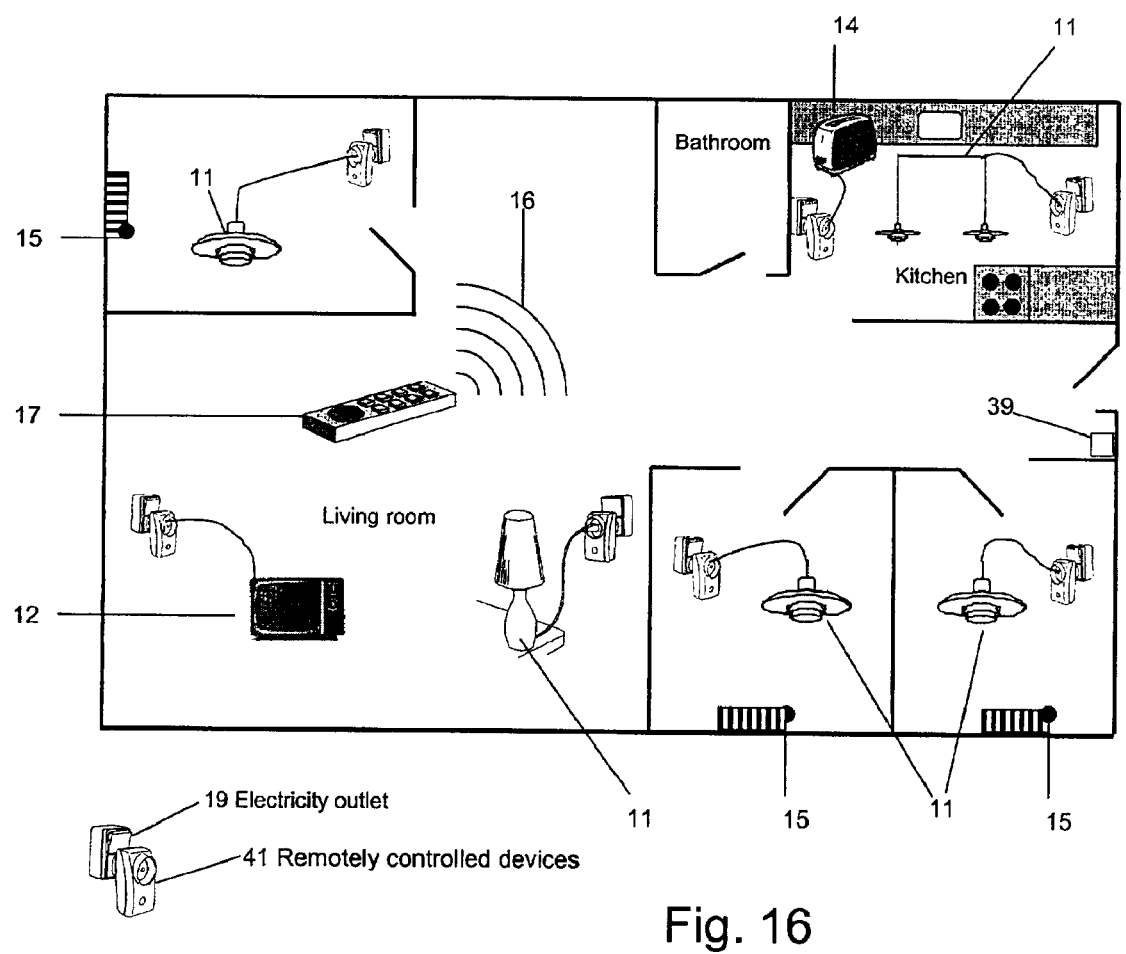
FIG. 16 illustrates an implementation of a system according to the second preferred embodiment of the present invention.

FIG. 16 shows an implementation of a system according to the preferred embodiment. FIG. 16 shows a ground plan of a house 18 with several rooms. The house has an inlaid electricity grid consisting of conducting wires 40 (thick lines) leading to a number of electricity outlets 19 (gray squares). This compares to the electricity net for a typical building. A number of different electric appliances connected to electricity outlets are positioned around the house, these are lamps 11, TV set 12, shaver 13, toaster 14, and thermostat 15 for radiator. Each appliance is connected to a device 41, which can be remotely controlled by a controller 17 through RF signals 16.

The devices 41 can be connected between the appliance and the electricity outlet 19 such as in the case of the toaster 14, or be an integrated part of the appliances as in the case of the TV set 12. Thereby controlling the device connected thereto can control the power supply to and/or the function of an appliance. Examples of this controlling is turning the lamps 11 on/off, change the operation status such as the channel of the TV set, setting another temperature on the thermostat 15 or activating the burglar alarm 39. Also, a device can report to the controller with a status of an appliance, such as the temperature in the room of the thermostat 15 or the status of the alarm 39.

In the embodiment described in relation to FIG. 16, a mood can comprise all devices connected to lamps 11 in the living room and the settings could be the amount of power supplied to the lamp by each device. By selecting this mood, all lamps in the living room would be dimmed to a predetermined level creating desired lighting. In another example, the mood comprises all thermostats 15 in the house and the settings are the desired room temperatures in each room. Hence by selecting the mood, a predetermined temperature set-up can be set around the house.

The following description of the Power & Lighting control system mainly deals with those aspects not comprised in the high-level description of general parts of the conceptual, scaleable system given in the description of the first preferred embodiment of the automation system. However, details and features described only in relation to the second embodiment are also valid with respect to the first preferred embodiment.

The Power & Lighting control system consists of the following elements.

Controllers

In the Power & Lighting embodiment, the controller is a mobile control panel such as a remote control, so that the use or programming of the system is not restricted to certain locations. Controllers have a display such as an LCD (Liquid Crystal Display) display. The controllers can optionally interface with a computer; moreover, a computer may also act as a controller in the system. The initial implementation and often also later setting of a device is carried out in the vicinity of the device. Although the data protocols makes use of addressing of devices using device identifier's, the person performing the programming can rely on his/her visual confirmation of the connection of an appliance to a given device. Hence the programming interface does not rely on the users ability to remember device codes, assigned numbers or alike.

Figure 12:
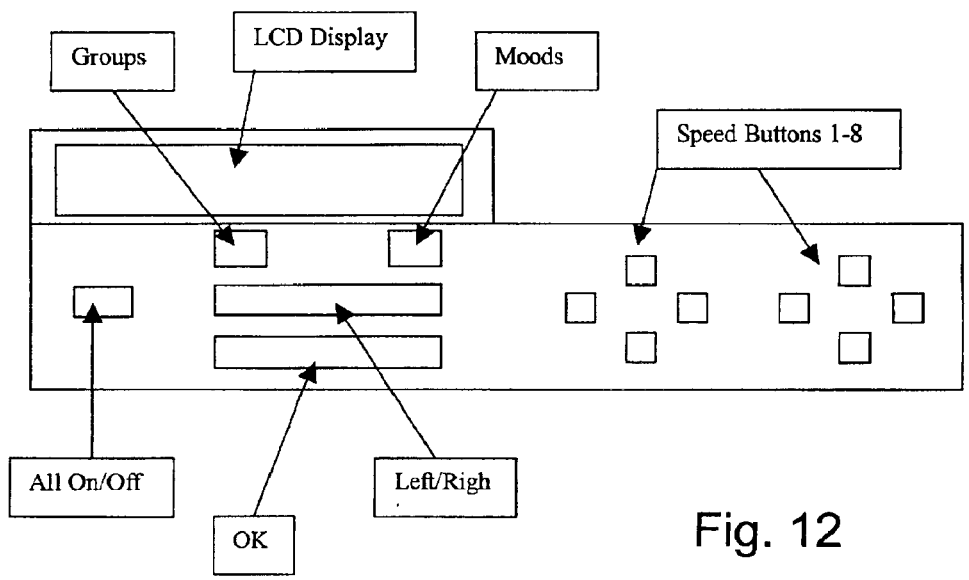
FIG. 12 shows a controller according to a second preferred embodiment of the invention.

FIG. 12 outlines a controller according to the second preferred embodiment. The controller has the following buttons:

The all On/Off button which will either switch all output devices On or Off except for those device that have been configured not to be included. The set-up of this function is specified later.

The eight speed buttons for quick access to the most commonly used groups or moods.

The Group button which sets the state of the speed buttons to be groups

The Mood button which sets the state of the speed buttons to be moods

The OK button which is mainly used within the menu system.

The Left and Right buttons which among other things are used to maneuver in the menu system.

Among other things, the following actions can be performed with the controller:

Programming devices to belong to the system (i.e. programming them with the unique Home ID number)

Assigning identifiers to new devices.

Programming devices to belong to one or several groups

Executing the on/off function on a given group

Executing the dim function on a given group

Programming devices to belong to one or several moods

Executing a given mood

Naming a given group with alphanumerical characters

Naming a given mood with alphanumerical characters

Setting a child protection on a device

Programming the timer

Initiating and interrupting the keylock function

Etc.

Several controllers can be utilized within a system, and signals from a first to a second controller can be related to:

Learning of Home ID and assigning of controller ID.

Replication or updating of various data on controllers.

Output Devices

The output devices are operationally connected between a power source and an electric appliance, typically in the form of an outlet socket connected to the power supply socket. The output devices can perform switching, dimming and optionally metering of power or current delivered to the electric appliance. Also, the output devices are able to perform as repeaters in the system.

A number of different types of output devices are feasible, ranging from low voltage switches to HVAC output devices etc. Each output device has only one actuator button. This button is used every time the device should notify a controller of its device identifier during programming procedures. The button can also be used to turn on/off and dim the output power supplied by the device without the use of a controller. However, this function can be overruled by the child protection function by making the button inactive for power adjustment purposes. The different functions of the button are utilized by pressing the button for different periods of time, e.g. a short period for turning on/off and dimming up/down when the button is pressed continuously.

Among other things, the output devices can perform the following actions:

Inform a controller of its presence and get ready to receive the Home ID and Device ID.

Toggle the current on/off by use of a button on the device

Dim the current by use of a button on the device

Execute commands received from a controller

Dim the current

Repeat the command received to other output devices

Toggle the current On/Off

Acknowledgement of received and executed commands

Reply with device status

Meter the power or current supplied to the electric appliance connected to the output device, and save, process and transmit the metered information.

The following paragraphs describe some of the functionality comprised in the Lighting system.

Group or Mood Switching

By pressing "Group Button" the user enters functions dealing with a single or a group of appliances such as lamps. By pressing "Mood Button" the user enters functions dealing with moods (e.g. setting a predefined Lighting for the room)

Group On/Off Setting

A user can turn on or off a single or a group of appliances by either using the speed buttons 1–8 or by using the scroll button. If the user uses button 1–8 then only a short press is required. The button will work as a toggle. If the scroll button is used the user must scroll to the desired group and press an OK button.

Group Dim Setting

A user can dim the current to a single or a group of appliances such as lamps (the same group as the on/off function) by either using the speed buttons 1–8 or by using the scroll button. If buttons 1–8 is used, the dimming will be activated when the button is pressed continuously. When the correct dimming level is reached the button is released. If the scroll button is used the user must scroll to the desired group and press additional buttons to dim up/down.

Command Acknowledgement on Display

Each command initiated by the user will be acknowledged through the display. A typical acknowledgement could for example be that "all lights are now off." Upon activating a device, the control panel expects an acknowledgement receipt from the device that the command has been carried out. Two events can occur:

The device does not respond with an acknowledgement:

The controller indicates e.g. "out of reach or device defect"

The device responds with an error message such as No Current Detected In Mains:

The controller indicates e.g. "Bulb or lamp defect"

The device responds with Command Executed:

The controller indicates e.g. "All OK"

Mood Programming Function

Moods can be programmed into the control panel by pre-setting the different devices to the desired current level, and afterwards storing this level in the control panel. Moods can be stored in buttons 1–8 or by using the scroll button for additional storage.

Mood Setting Function

A user can activate pre-set moods (e.g. TV watching or working mood) by using the control panel's 1–8 buttons. If the scroll button is used the user must scroll to the desired group and press an OK button.

All on/off Setting

A user can turn on or off all switches by pressing the "all on/off" button. A device will per default be programmed to respond to the "all on/off" button, but can also be programmed not to.

All on/off Programming

Should a user require that a certain device should not respond to "all on/off" it can be done so by setting this on the control panel. This could e.g. be beneficial for the fish tank or the outdoor lights.

Random On/Off Setting

The user can use the control panel to set a device to random turn on and off (i.e. used to keep away burglars). The device will keep turning on and off with e.g. 3 hrs. interval and abort this action next time it receives any instruction from the control panel. The time interval in which the control panel should randomly switch on and off can also be set (e.g. from 18:00 to 23:00)

Random on/off Programming

Should a user require that a certain device should not respond to "random on/off" it can be done so by setting this on the control panel. This could e.g. be beneficial for the fish tank or the outdoor lights.

Device Resetting

All devices can be reset whereby the Home ID and the Device ID held by the device is deleted and all references to the device identifier in the controller is deleted. In the Power & Lighting embodiment, the resetting is carried out by setting the controller in "device reset" mode and pressing the actuator button on the device. This makes the device transmit information to the controller, which then perform the resetting.

Programming and Learning

In the following, the procedures for performing some of the programming and learning functions within the systems are outlined with reference to FIGS. 20 to 22. In the user interface the choices are presented as menus on the LCD display of the controller, and can be selected using buttons under the display.

Group Menu

When selecting the group menu on the main menu, the following three things can be done to the groups after they have been created such as during addition of new devices.

Name the group: Each group can be named with alphanumerical numbers to improve the user friendliness.

Figure 13:
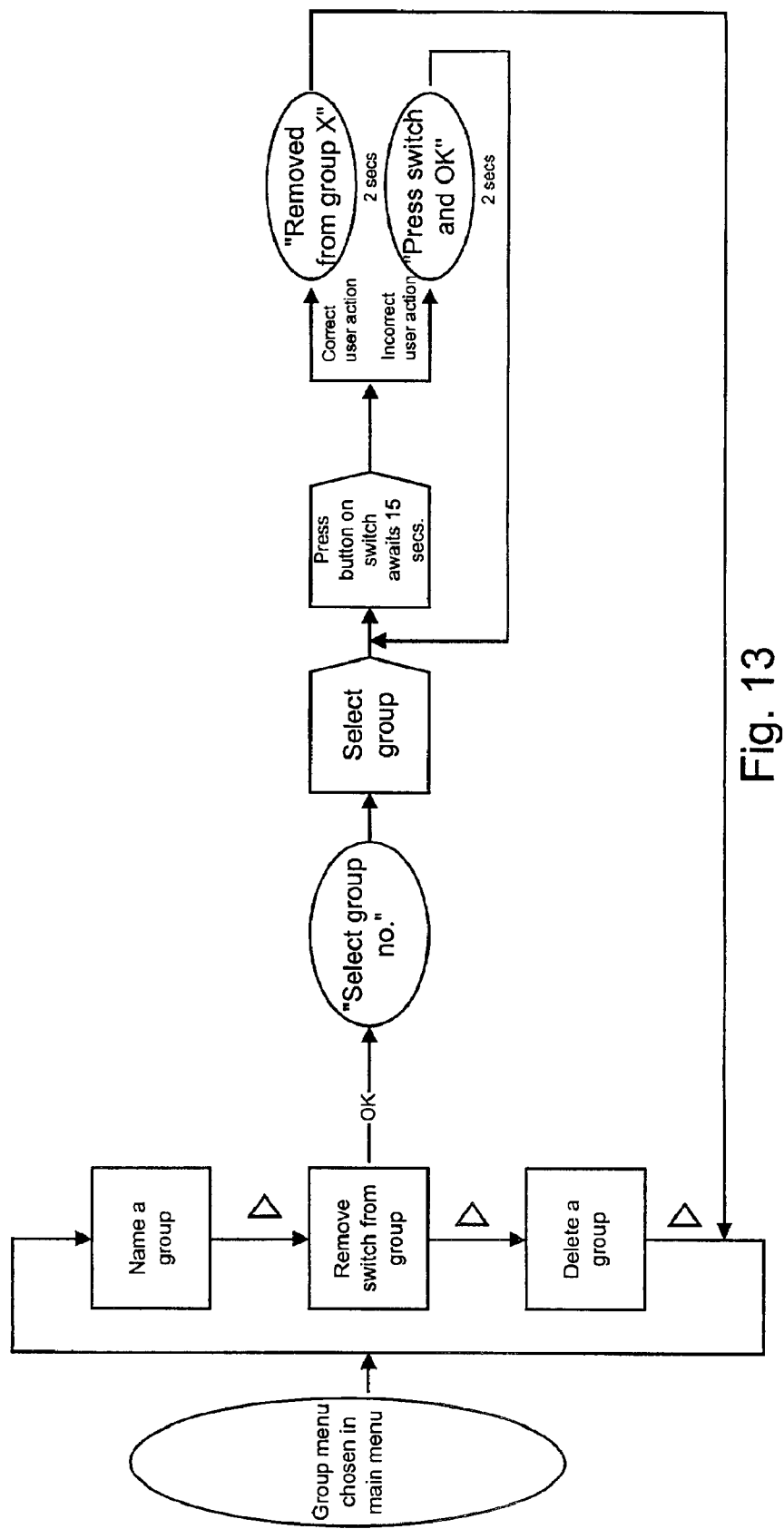
FIG. 13 is a flow diagram showing the procedure for removing a device from a group on the controller according to the second embodiment of the present invention.

Remove a switch from a group: When the different devices have been added to a specific group then this menu functionality enables the user to remove individual switches from a specific group. The procedure of how this is done is shown in FIG. 13. First the user selects the "Remove Switch from Group" menu option and is prompted for the group number in which the device is to be removed. Then the user has to press a button on the output device in order for controller to get the device id to remove. When the button on the output device has been pressed to specific device has been removed from the group table and the menu system return to the main menu.

Delete a group: This menu item allows the user to completely delete a group.

Mood Menu

Moods are groups of devices in which the setting of each device is set to a desired dim level or current. When selecting the mood menu on the main menu, the following options are available in the mood menu section.

Figure 14:
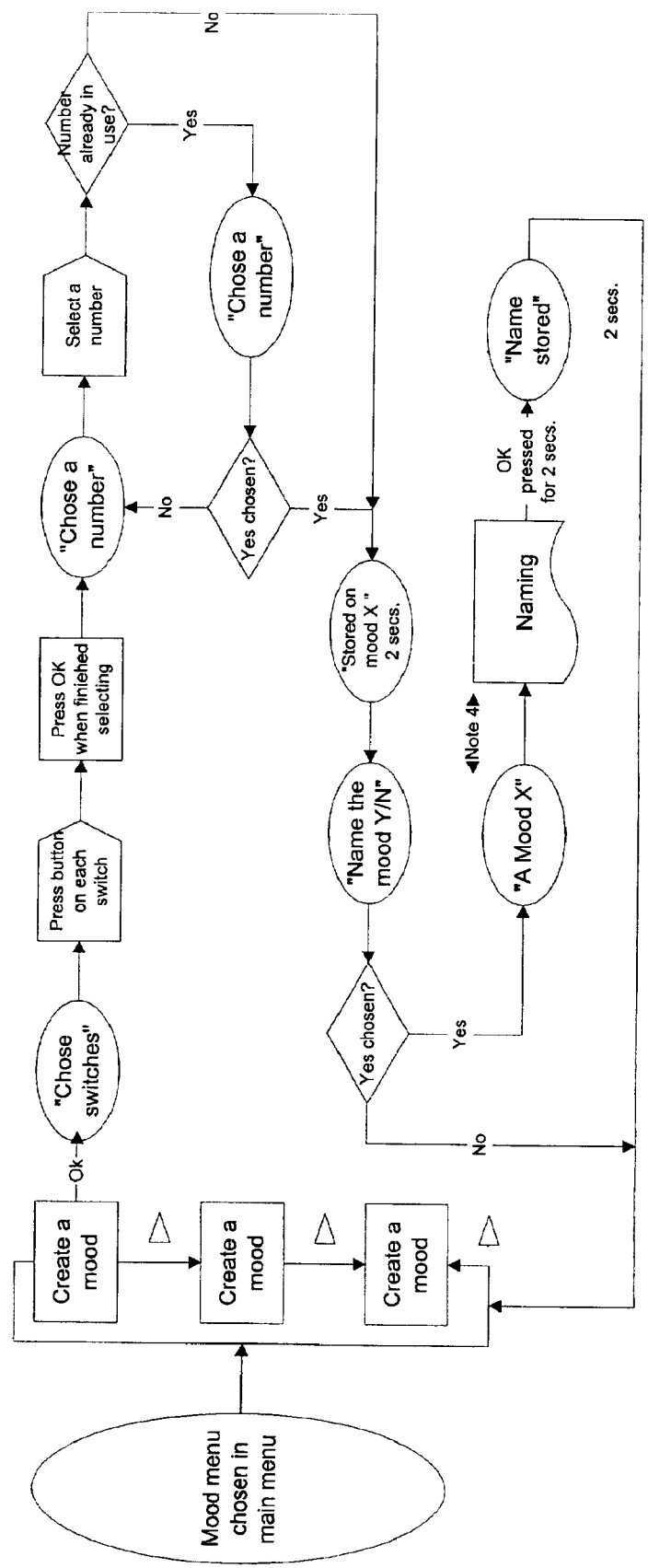
FIG. 14 is a flow diagram showing the procedure for creating a mood on the controller according to the second embodiment of the present invention.

Create a Mood: This menu item allows the user to add devices into a mood. The procedure is outlined in FIG. 14. First the user selects the "create a Mood" menu option and is prompted to select devices to include in the mood. The user then presses a button on all of the output devices which are to be included in the mood and presses OK when done. The output devices then transmit its current dim level to the controller. Then the user is prompted for a mood number to add the already selected devices into. If the mood is already is in use then user has to determine whether to replace the mood with the selected devices or to choose another mood number. The user then has the option to name the mood. The user can now select the alphanumerical characters on a toggle menu using the Left/Right and the OK button. When the name is typed, the user holds the OK button for more than 2 seconds whereby the controller saves the mood name and returns to the main menu.

Name a Mood: Each mood can be named with alphanumerical numbers to improve the user friendliness.

Removed switches from Mood: When the different devices have been added to a specific mood then this menu functionality enables the user to remove individual switches from a specific mood again. The method is equivalent to the method used when removing switches from groups.

Delete a Mood: The menu item allows the user to completely delete a mood.

The all On/Off functionality is per default set to be all devices known by the controller. Individual switches can repeatable be removed or added from this function. There is also a possibility to customize whether the button is to toggle On/Off or only to use this button as a switch off button.

Controller Replication

Figure 15:
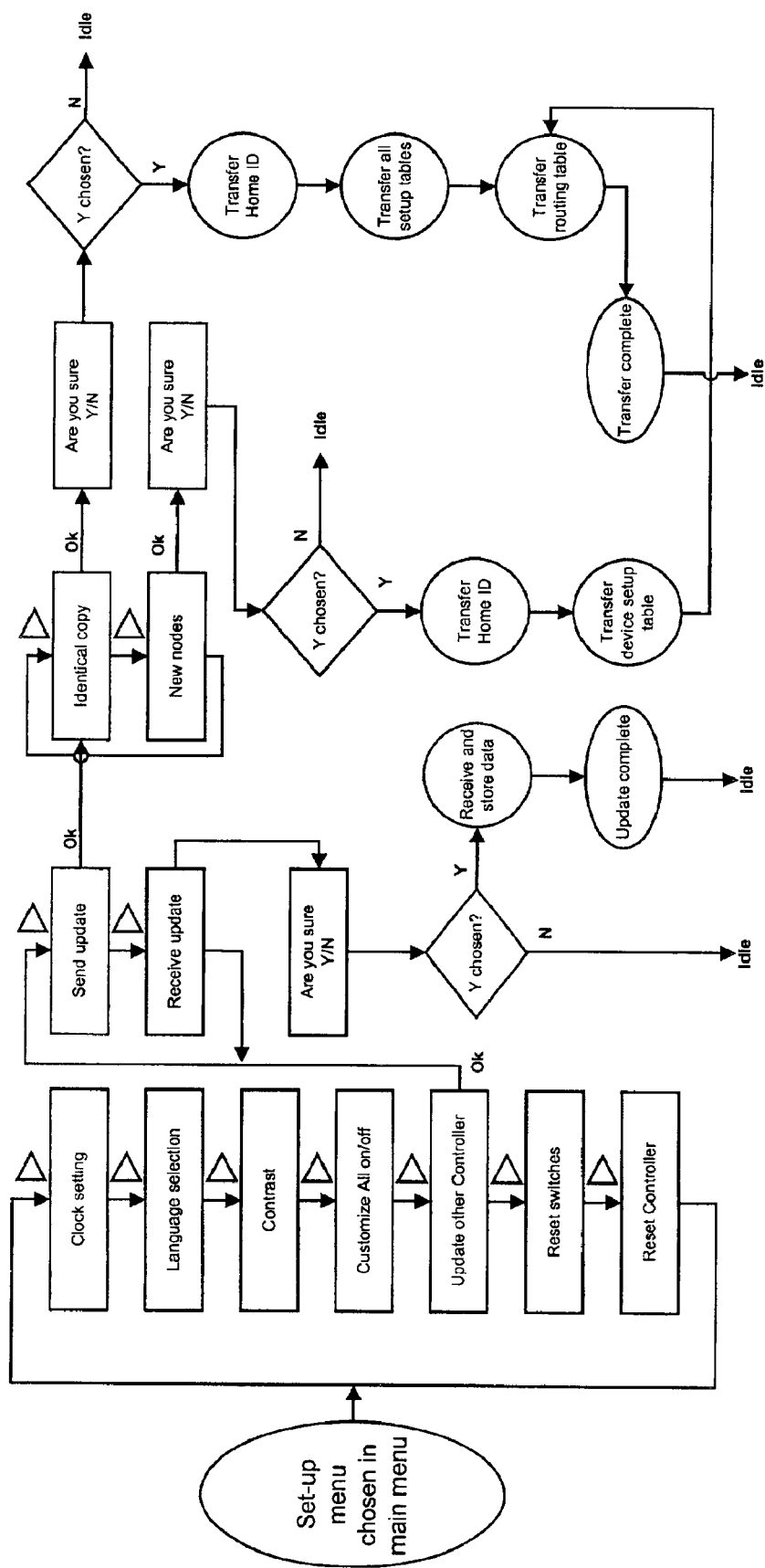
FIG. 15 is a flow diagram showing the procedure for learning of a controller according to the second embodiment of the present invention.

To ease the use of having several controllers operating within the same Home ID the product has the feature to update each other with the different tables and settings. The updating process is shown in FIG. 15. The user is first prompted for whether the current controller should send data to the other controller or receive data from the other controller. If the user selects receiving data the controller enters a learning-programming mode and will return to the main menu when the updates has been received. If the user selects the option to send data, the user is prompted for whether he/she wants to update the other controller or make an identical copy/replication of current controller. If the update is chosen, only specific data is transmitted. If identical copy/replication is chosen, the Home ID and all tables containing Groups, Moods, etc. is transmitted. When the update or identical copy/replication is completed, the system returns to the main menu.

Hardware

The controllers and the devices according to the first and/or second embodiment have some common hardware such as:

RF Transceiver with the following characteristics:
  Very flexible frequency band
  Programmable output power
  Data-rate up to 9600 bit/s
  FSK modulation
  Suitable for frequency hopping protocols
  Low power consumption Microprocessor with the following characteristics:
  High Speed RISC Architecture
  Very Low power consumption
  Integrated RAM, EEPROM and FLASH memory In the second embodiment, the Power & Lighting system, the control panel and the output devices further comprises:

The control panel:
  Two line LCD display
  13 button soft keypad
  Battery holder for three type AAA batteries
  Timer chip which is used to show the time and set timers for the burglar deterrent function.

The output devices:
  The components on the devices are powered from the 220/110-volt power outlets in the wall after it has been transformed down to 3.3 v. The dim and on/off function is controlled by a very powerful TRIAC. The output devices have one actuator button used in programming procedures and to adjust the power supplied by the device.

The following are typical requirements to the code in the protocol

The controller code should be able to run on an Atmel Mega163 running at 3.7 MHz and on a embedded Synopsys 8051 running at 3 MHz. The code should use a maximum of 534 bytes of RAM and a maximum of 2K bytes of flash.

The device code should be able to run on an Atmel 4414 running at 3.7 MHz and on a embedded Synopsys 8051 running at 3 MHz. The code should use a maximum of 32 bytes of RAM and a maximum of 512 bytes of flash.

What is claimed is:

1. An automation system for controlling and monitoring devices in a network of devices comprising:
  plurality of devices to be controlled, each of the devices comprising:
    a radio frequency receiver for receiving signals,
    a radio frequency transmitter for transmitting the signals,
    a memory for storing data representing a device identifier identifying the device and storing other data, a processing unit for administering the reception and transmission of the signals and being adapted to read data from and store data in the memory, a controller comprising:

a radio frequency transmitter for transmitting the signals, a radio frequency receiver for receiving the signals, another memory for storing data representing a controller identifier identifying the controller and storing data representing a device table holding device identifiers of the devices controlled by the controller, a processing unit for administering the reception and transmission of the signals and being adapted to read data from and store data in the another memory, wherein the processing unit of the controller comprises means for generating a first type signal for instructing a first device to discover others of the devices within its range, said first type signal comprising the device identifier of the first device as a destination identifier and at least some of the device identifiers from the device table, and wherein the processing unit of any first device of the plurality of devices comprises means for:

upon receiving a first type signal from the controller with its identifier as the destination identifier, generating second type signals for each of the device identifier in the first signal, each of the second signals comprising the device identifier from the first type signal as the destination identifier and the device identifier of the first device as source identifier, upon receiving the second type signal from another of the devices with its identifier as the destination identifier, acknowledging the reception of the second type signal by generating a third type acknowledgement signal to said another of the devices, the third type signal comprising the source identifier of the received second type signal as the destination identifier and the destination identifier of the received second type signal as the source identifier, and upon receiving a third type signal from another of the devices with its identifier as the destination identifier, storing data representing the source identifier of the third type signal in its memory.

2. An automation system according to claim 1, wherein the memory of the controller is further adapted to store data representing a routing table, wherein the processing unit of any first device of the plurality of devices further comprise means for generating a fourth type signal comprising the identifier of the controller as the destination identifier, stored data representing the source identifiers of any received third type signals, and the device identifier of the first device as a the source identifier, and wherein the processing unit of the controller further comprises means for receiving fourth type signals from the devices to be controlled and forming the routing table indicating for each one of the plurality of devices, others of the devices which the each one device can successfully transmit the signals to and receive signals from.

3. An automation system according to claim 1, wherein the memory of the controller is further adapted to store data representing a most used entry point list and wherein the processing unit of the controller further comprises means for forming and storing the most used entry point list in the memory by registering the number of successfully and failed transmitted signals from the controller to each of the devices in the network, said most used entry point list indicating the device identifiers of the devices with which the controller regularly communicates.

4. An automation system according to claim 3, wherein the most used entry point list comprises the device identifiers for one or more of the devices in the network and a counter related to each of the device identifiers in the list, said counter giving an indication of the number of successful transmissions to the related device.

5. An automation system according to claim 4, wherein the means for forming the most used entry point list is adapted to, in case of a transmission to a the device in the most used entry point list, increase the counter related to the device if the transmission is successful and to decrease the counter related to the device if the transmission fails, and wherein the means for forming the most used entry point list is further adapted to, in case of a transmission to the device which is not in the most used entry point list, include the device in the most used entry point list if the transmission is successful.

6. An automation system according to claim 2, wherein the memory of the controller is further adapted to store data representing a preferred repeater list and wherein the processing unit of the controller further comprises a routine for analyzing the routing table to form a preferred repeater list indicating one or more of the devices which together can route the signal from any of the devices in the routing table to any other of the devices in the routing table and store said preferred repeater list in the memory of the controller.

7. An automation system according to claim 1, wherein the means for generating the first type signal is adapted to generate the first type signal to the first device in response to a predetermined action.

8. An automation system according to claim 7, wherein the processing unit of the controller is further adapted to add another of the devices to the device table, and wherein the addition of the first device to the device table is the predetermined action.

9. An automation system according to claim 1, wherein each of the devices controlled by the controller is comprised of one or more groups of the devices to be collectively controlled, each of the groups comprising at least one of the devices, wherein the processing unit of the controller further comprises means for adding another of the devices to and removing the another of the devices from the one or more of the groups, and wherein the means for adding and removing the devices to/from the groups is adapted to virtually mark the device in the memory of the first processing unit when it is removed from the group.

10. An automation system according to claim 7 or 9, wherein the addition of the first device to the group is a predetermined action if the first device is virtually marked.

11. An automation system according to claim 1, wherein the first type signal comprises all of the device identifiers from the device table, except the device identifier of the first device.

12. An automation system according to claim 1, wherein each of the plurality of devices further comprise means for providing an output to, or receiving an input from, an appliance operationally connected to the device, wherein the processing unit of the controller further comprises means for generating a fifth type signal comprising at least one of the destination identifiers corresponding to the device identifiers of the destination device, information related to the operation of the destination device or the appliance connected to the destination device, and repeater identifiers corresponding to one or more signal repeating devices, and wherein one or more of the plurality of devices are further adapted to act as the signal repeating devices in that the processing units of each of said one or more of the devices comprise means for, upon reception of a fifth type signal, processing said information in its processing unit if the at least one destination identifier corresponds to the device identifier of the device, and means for, upon reception of a fifth type signal, transmitting another fifth type signal holding the at least one destination identifier and said information if one of the one or more repeater identifiers corresponds to the device identifier of the device.

13. An automation system according to claim 12, wherein all of the devices are adapted to act as the signal repeating devices.

14. An automation system according to claim 2 or 12, wherein the processing unit of the controller comprises means for identifying in the routing table device identifiers of devices for repeating a first type signal having the predetermined destination identifier, and to include said device identifiers as repeater identifiers in the first type signal.

15. A method for determining a network topology in an automation system network for controlling and monitoring devices comprising:

a plurality of devices to be controlled, each of the devices comprising a memory for storing data representing a device identifier identifying the device and storing data representing a routing line indicating others of the devices which the device can successfully transmit signals to and receive the signals from, and a processing unit for administering the reception and transmission of the signals and being adapted to read data from and store data in the memory, a controller comprising a another memory storing data representing a controller identifier identifying the controller and storing data representing a device table for holding the device identifiers of the devices controlled by the controller, and a processing unit for administering the reception and transmission of the signals and being adapted to read data from and store data in the another memory, said method comprising the steps of:

transmitting a first type signal from the controller for instructing a first device to discover others of the devices within its range, said signal comprising the device identifiers from the device table, receiving the first type signal at the first device and transmitting the second type signals from the first device addressed to the devices in the device table, transmitting, from each of the other devices that receives one of the second type signals addressed to it, a third type signal acknowledging the reception of the received second type signal, and receiving any third type signal at the first device and storing data representing the device identifiers of the devices which transmitted the received third type signal in the routing line in the memory of the first device.

16. A method according to claim 15, wherein the memory of the controller is further adapted to store data representing a routing table indicating for each one of the plurality of devices, others of the devices which the each one device can successfully transmit the signals to and receive the signals from, the method further comprising the steps of:

transmitting a fourth type signal from the first device to the controller, the fourth type signal holding the routing line, and receiving the fourth type signal at the controller and storing the routing line in the routing table of the memory of the controller.

17. A method according to claim 15, wherein the memory of the controller is further adapted to store data representing a most used entry point list indicating the device identifiers of the devices with which the controller regularly communicates and a counter related to each of the device identifiers in the list, said counter giving an indication of the number of successful transmissions to the related device, the method further comprises the steps of registering the number of successfully and failed transmitted signals from the controller to each of the devices in the network, and after a transmission to one of the devices in a most used entry point list, increasing the counter related to the device if the transmission is successful, and decreasing the counter related to the device if the transmission fails.

18. A method according to claim 17, further comprising the steps of, in case of a transmission to another of the devices which is not in the most used entry point list, including the another of the devices in the most used entry point list if the transmission is successful.

19. A method according to claim 16, wherein the memory of the controller is further adapted to store data representing a preferred repeater list, the method further comprising the steps of analyzing the routing table to identify one or more of the devices which together can route one of the signals from any of the devices in the routing table to any others of the devices in the routing table, and storing data representing the device identifiers of these one or more of the devices in the preferred repeater list.

20. A method according to claim 15, wherein the controller is triggered to transmit the first type signal for instructing the first device to discover others of the devices within its range by a predetermined action.

21. A method according to claim 20, wherein the processing unit of the controller is further adapted to add the others of the devices to the device table, and wherein the addition of the first device to the device table is the predetermined action.

22. A method according to claim 20, wherein each of the devices controlled by the controller is comprised of one or more groups of the devices, each of the groups comprising at least one of the devices, and wherein the processing unit of the controller further comprises means for adding the at least one of the devices to and removing the at least one of the devices from the groups, wherein the at least one of the devices is virtually marked when it is removed from one of the groups, and wherein the addition of the at least one of the devices to one of the groups is the predetermined action if the added the at least one of the devices is virtually marked.

23. A controller for controlling devices in an automation system, said controller comprising:

a radio frequency transmitter for transmitting signals, a radio frequency receiver for receiving the signals, a memory for storing data representing a controller identifier identifying the controller and storing data representing a device table holding device identifiers of the devices controlled by the controller, a processing unit for administering the reception and transmission of the signals and being adapted to read data from and store data in the memory, wherein the processing unit of the controller comprises means for generating a first type signal for instructing a first device to discover other of the devices within its range, said first type signal comprising the device identifier of the first device as a destination identifier, a list of the device identifiers from the device table, and instructions to the first device to generate and transmit second type signals to the devices from said list for determining which of the devices from said list can be reached from the first device.

24. A device to be controlled by a controller in an automation system comprising a plurality of devices, each of said devices comprising:

a radio frequency receiver for receiving signals, a radio frequency transmitter for transmitting the signals, a memory for storing data representing a device identifier identifying the device and storing other data, a processing unit for administering the reception and transmission of the signals and being adapted to read data from and store data in the memory, wherein the processing unit of the device comprises means for:

upon receiving a signal of a first type comprising its identifier as a destination identifier, a list of the device identifiers, and instructions to the device to generate and transmit signals of a second type to the devices from said list for determining which of the devices from said list can be reached from the device, generating second type signals for each of the device identifiers in the list, each second type signal comprising the device identifier from the list as the destination identifier and the device identifier of the device as a source identifier, upon receiving a second type signal from another of the devices with its identifier as the destination identifier, acknowledging the reception of the second type the signal by generating a third type acknowledgement signal to said another of the devices, the third type signal comprising the source identifier of the received second type signal as the destination identifier and the destination identifier of the received second type signal as the source identifier, and upon receiving a third type signal from another of the devices with its identifier as the destination identifier, storing data representing the source identifier of the third type signal in its memory.

25. A method for routing signals in an automation system network for controlling and monitoring devices comprising:

a plurality of devices to be controlled, each of the devices comprising a memory storing data representing a device identifier identifying the device and a processing unit for administering the reception and transmission of signals, a controller comprising a memory storing data representing a controller identifier identifying the controller, storing data representing a routing table indicating for each one of the plurality of devices, others of the devices which the each one device can successfully transmit the signals to and receive the signals from, and storing data representing a most used entry point list being an ordered list indicating the device identifiers of the number, N of the devices that have the highest transmission success counter corresponding to the number of successful transmission from the controller to the device minus the number of failed transmissions from the controller to the device, and a processing unit for administering the reception and transmission of the signals and being adapted to read data from and store data in the memory, said method comprising the steps of:

A. transmitting a first signal from the controller to a specified one of the devices at least once, said signal comprising the identifier of the specified device as a destination identifier, B. if said first signal is received by the specified device, transmitting an acknowledgement signal from the specified device to the controller, C. if the acknowledgement signal is not received by the controller, then choosing the first device from a most used entry point list as a first repeating device, D. determining a route to the specified device in the routing table, the route using one or more repeating devices, the first of which is the first repeating device, E. transmitting a second routed signal from the controller at least once, said signal comprising the identifier of the specified device as the destination identifier and the identifiers of the one or more repeating devices from the route determined in step D as repeater identifiers, F. transmitting a routed acknowledgement signal from the specified device to the controller upon reception of the routed second signal, and G. as long as the routed acknowledgement signal is not received by the controller from the specified device, then repeating steps D, E, and F for N−1 times using the second, third, . . . Nth device from the most used entry point list as the first repeating device.

26. A method according to claim 25, wherein the memory of the controller further stores data representing a preferred repeater list indicating one or more of the devices which together can route the signal from any of the devices in the routing table to any others of the devices in the routing table, and wherein the method further comprises the steps of:

H. if the routed acknowledgement signal of the Nth second routed signal is not received by the controller from the specified device, then choosing the first device from the preferred repeater list that is not in the most used entry point list as the first repeating device, I. determining a route to the specified device in the routing table, the route using one or more repeating devices, the first of which is the first repeating device, J. transmitting a second routed signal from the controller, said signal comprising the identifier of the specified device as the destination identifier and the identifiers of the one or more repeating devices from the route determined in step H as the repeater identifiers, K. transmitting the routed acknowledgement signal from the specified device to the controller upon reception of the routed second signal, and L. as long as the routed acknowledgement signal is not received by the controller from the specified device, then repeating steps H, I, and J for each device in the preferred repeater list using the corresponding device from the preferred repeater list as a first repeating device.

27. A method according to claim 25, wherein the processing units of each of the plurality of devices are further adapted to provide an output to, or receive an input from, an appliance operationally connected to the device, the method further comprising the steps of:

transmitting a third signal from the controller, the third signal comprising at least one destination identifier corresponding to the identifier of the destination device or destination controllers, information related to the operation of one of the devices or an appliance connected to the one of the devices, and one or more repeater identifiers corresponding to device identifiers of one or more of the signal repeating devices, receiving the third signal at one of said plurality of devices, if the at least one of the destination identifiers corresponds to the device identifier of the receiving device, then processing said information in the processing unit of the device, and if one of the one or more of the repeater identifiers corresponds to the device identifier of the receiving device, then transmitting a fourth signal holding said at least one destination identifier and said information.

28. A method according to claim 27, wherein the third signal is transmitted by the controller, the at least one destination identifier comprised in the third signal is the device identifier, and wherein the information comprised in the third signal comprises instructions to a processing unit of the destination device to provide an output to, or receive an input from, the appliance connected to the destination device.

29. A method according to claim 27, wherein the third signal is transmitted by one of the devices, wherein the at least one of the destination identifiers comprised of the third signal is a controller identifier, and wherein the information held by the third signal is related to a state or a reading of the device transmitting the third signal.

30. A method according to claim 27, further comprising the step of, upon receiving the third or a fourth signal at one of the devices or the controller, generate and transmit a first acknowledgement signal having the identifier of the device or the controller transmitting the third or the fourth signal as the destination identifier.

31. A method according to claim 30, wherein the first acknowledgement signal comprises the destination identifier and one or more of the repeater identifiers, the method further comprising the steps of receiving said first acknowledgement signal at a one of the devices and if one of the one or more repeater identifiers correspond to the device identifier of the receiving device, then transmitting a second acknowledgement signal holding said destination identifier.

* * * * *